United States Patent
Dobelmann-Mara et al.

(10) Patent No.: US 11,359,031 B2
(45) Date of Patent: Jun. 14, 2022

(54) COMPOSITION FOR OPHTHALMOLOGICAL PRODUCTS

(71) Applicant: Johnson & Johnson Surgical Vision, Inc., Irvine, CA (US)

(72) Inventors: Lars Dobelmann-Mara, Gross-Zimmern (DE); Simon Helmstetter, Egelsbach (DE); Stefan Riedmueller, Frankfurt am Main (DE); Martin Schraub, Alsbach-Haehnlein (DE)

(73) Assignee: Johnson & Johnson Surgical Vision, Inc., Irvine, CA (US)

( * ) Notice: Subject to any disclaimer, the term of this patent is extended or adjusted under 35 U.S.C. 154(b) by 0 days.

(21) Appl. No.: 16/957,011

(22) PCT Filed: Dec. 18, 2018

(86) PCT No.: PCT/EP2018/085433
§ 371 (c)(1),
(2) Date: Jun. 22, 2020

(87) PCT Pub. No.: WO2019/121642
PCT Pub. Date: Jun. 27, 2019

(65) Prior Publication Data
US 2020/0332041 A1    Oct. 22, 2020

(30) Foreign Application Priority Data
Dec. 22, 2017 (EP) ..................................... 17210179

(51) Int. Cl.
| | | |
|---|---|---|
| *C08F 2/02* | (2006.01) | |
| *C08F 2/48* | (2006.01) | |
| *G02B 1/04* | (2006.01) | |
| *C08F 220/30* | (2006.01) | |
| *C08F 220/18* | (2006.01) | |

(52) U.S. Cl.
CPC .................. *C08F 2/02* (2013.01); *C08F 2/48* (2013.01); *C08F 220/302* (2020.02); *G02B 1/043* (2013.01); *C08F 220/1818* (2020.02)

(58) Field of Classification Search
CPC ..................................................... G02B 1/043
See application file for complete search history.

(56) References Cited

U.S. PATENT DOCUMENTS

| | | | |
|---|---|---|---|
| 8,109,999 B2 | 2/2012 | Hampp | |
| 8,247,511 B2 | 8/2012 | Mentak | |
| 8,329,842 B2 | 12/2012 | Ritter et al. | |
| 10,457,658 B2 * | 10/2019 | Dobelmann-Mara | ....................... C07D 335/06 |
| 10,723,713 B2 | 7/2020 | Dobelmann-Mara et al. | |
| 11,078,177 B2 * | 8/2021 | Dobelmann-Mara | ....................... C07D 335/06 |
| 2010/0324165 A1 * | 12/2010 | Ritter | ....................... A61F 2/14 523/106 |
| 2011/0205482 A1 * | 8/2011 | Goetz | ................ C09K 19/3402 349/183 |
| 2018/0162817 A1 | 6/2018 | Dobelmann-Mara et al. | |

FOREIGN PATENT DOCUMENTS

| | | |
|---|---|---|
| EP | 1926454 B1 | 3/2010 |
| WO | 0118079 A1 | 3/2001 |
| WO | 08013950 A2 | 1/2008 |
| WO | 09074520 A2 | 6/2009 |
| WO | 17032442 A1 | 3/2017 |
| WO | 17032443 A1 | 3/2017 |
| WO | 17032444 A1 | 3/2017 |

OTHER PUBLICATIONS

Daniel M. Schwartz et al, "Light-adjustable lens: development of in vitro nomograms", Transactions of the American Ophthalmological Society Bd 102, Dec. 2004, 67-74.
M. Schraub et al, "photoinduced refractive index changes . . . ." European Polymer Journal 51 (2014) 21-27.
A. Miyata et al, "Equilibrium water content and glistenings . . . ." J Cataract Refract Surg, 2004, 30, 1768-1772.
Bozukova D; Pagnoulle C; Jerome R; Jerome C: "Polymers in modem ophthalmic implants—Historical background and recent advances", Material Science and Engineering R, vol. 69, 2010, pp. 63-83, XP027189262.
R. H. Trivedi et al, "Post Cataract-interocular lens (IOL) . . ." Eye (2002) 16, 217-241.
X. Miyata et al, "clinical and Experimental Observations . . . ." Jpn J Ophthalmol, 2001, 45, 564-569.
International Search Report in PCT/EP2018/085433 dated Feb. 12, 2019 (pp. 1-3).

* cited by examiner

*Primary Examiner* — Michael F Pepitone
(74) *Attorney, Agent, or Firm* — Johnson & Johnson Surgical Vision, Inc.

(57) ABSTRACT

The present invention relates to a composition for ophthalmological products, to corresponding copolymers and the preparation thereof and to the use thereof for the production of ophthalmic lenses or ophthalmological implants and to these products.

15 Claims, No Drawings

COMPOSITION FOR OPHTHALMOLOGICAL PRODUCTS

CROSS-REFERENCE TO RELATED APPLICATIONS

This application is a national stage application under 35 USC § 371 of international application PCT/EP2018/085433 filed Dec. 18, 2018.

TECHNICAL AREA

The present invention relates to a composition for ophthalmological products, to corresponding copolymers and the preparation of and to the use thereof for the production of ophthalmic lenses or ophthalmological implants and to these products.

PRIOR ART

Cataract denotes opacification of the ocular lens which leads to slow, painless loss of visual acuity, in particular if the opacification starts in the central region of the lens. Those affected perceive their environment "like through fog". The opacified lens can in most cases be replaced surgically by a synthetic lens implant, so-called intraocular lenses (IOLs).

A multiplicity of intraocular lenses is known. An intraocular lens is constructed, for example, from a central optical lens and the peripherally attached haptic, which fixes the optical lens in the eye. The haptic can have various shapes, for example C-loop haptics or plate haptics. On the basis of the material, the lenses can be divided into hard, non-foldable IOLs and soft, foldable IOLs. The hard lenses consist of polymethyl methacrylate. Foldable lenses consist of acrylates, siloxanes or hydrogels. The advantage of foldable lenses essentially consists in that a smaller incision is necessary for the implantation. A new form of intraocular lens is the light-adjustable lens (LAL). In the case of the LAL, the lens power can be adjusted after the operation by irradiation with light of suitable wavelength, for example UV light.

A phakic intraocular lens (PIOL) is an artificial lens which is implanted into the eye in addition to the natural lens. Phakic intraocular lenses can be implanted as part of correction of defective vision. A PIOL is constructed from the central optical lens and the peripherally adjacent haptic, which fixes the optical lens in the eye. On the basis of the localisation of the PIOL in the eye, a distinction is made between anterior chamber and posterior chamber lenses. The anterior chamber lens is implanted between cornea and iris, the posterior chamber lens between iris and ocular lens. Anterior chamber lenses consist either of hard polymethyl methacrylate or soft materials, such as silicone or acrylic compounds. Posterior chamber lenses are generally made from soft materials.

A light-adjustable lens can consist, for example, of siloxanes which contain radicals that are photochemically active in the UV range. If the LAL is irradiated with UV light, the polymers change their structure. The first light-adjustable lens was developed in 1999 by the American ophthalmologist Dr. Daniel Schwarz and Robert Grubbs (Daniel M. Schwartz et al, Light-adjustable lens: development of in vitro nomograms; in Transactions of the American Ophthalmological Society Vol 102, December 2004, 67-74.) The development of suitable materials for IOLs has advanced rapidly.

U.S. Pat. No. 8,247,511, for example, describes the production of an intraocular lens in which a rigid copolymer is prepared from a first monomer selected from the group of ethylene glycol phenyl ether acrylate (EGPEA) and polyethylene glycol phenyl ether acrylate [(poly-EG)PEA], a second monomer from the group of the unsubstituted or substituted styrenes and a third monomer containing an ethylenically unsaturated group which would form a hydrogel as homopolymer, a rigid intraocular lens is formed, and this is converted into a foldable intraocular lens by hydration, where the lens has a refractive index of about 1.50.

Artificial intraocular lenses which are formed from a polymer material which contains photochemically activatable groups, so that a photoinduced modification of the optical properties of the artificial intraocular lens can be carried out, are known, for example, from EP 1926454.

M. Schraub et al, European Polymer Journal 51 (2014) 21-27, describes, for example, the photochemistry of polymethacrylates containing 3-phenyl-coumarine.

WO 2017/032442, WO 2017/032444 and WO 2017/032443 describe materials for the production of medical devices, preferably ophthalmological products, particularly preferably for the production of intraocular lenses. These materials can preferably be used as photoactive monomers in the preparation of suitable polymers or copolymers of the products.

Both hydrophobic, soft acrylate polymers and siloxane polymers, which are known for use for the production of intraocular lenses, exhibit glistening. The tendency towards glistening is more pronounced in the first-mentioned polymers. According to A. Miyata and S. Yaguchi, *J Cataract Refract Surg* 2004; 30:1768-1772, glistening is a phase-separation phenomenon that occurs in the case of temperature variations as soon as the polymer is located in an aqueous environment, as is the case in the human eye. The water content of the polymer increases with the temperature. In the case of a temperature drop, the water absorption capacity of the polymer falls, causing phase separation. The polymer phase here has a different refractive index to the water phase, causing the water phase in the form of vacuoles to be perceived as glistening. The degree of glistening is crucially determined by the temperature dependence of the water content of the polymer. The greater the temperature dependence, the more severe the glistening-induced visual impairment of the patient can be.

The water content of a polymer can be increased by addition of a hydrophilic component during the polymerisation. A hydrophilic component is a monomer whose uncrosslinked homopolymer is water-soluble or swellable in water. A crosslinked copolymer which contains a hydrophilic component can be, for example, a hydrogel. Such hydrogels form a further class of ophthalmological materials, namely hydrophilic acrylate polymers. These are rigid in the dry state and become soft after swelling in water, as known, for example, from U.S. Pat. No. 8,247,511 and Bozukova D et al, Mat. Sci. Eng. 2010, 69:63-83.

The water content of such polymers is greater than 10 percent by weight. If the water content of a swollen polymer of this type is greater than 10 percent by weight, the term hydrophilic polymer can be used.

In contrast to hydrophobic acrylate polymers, hydrogels do not exhibit glistening, but calcification occurs in them, as described in Trivedi et al, Eye 2002, 16: 217-241. Calcification refers to calcium compounds which deposit principally on the lens surface and cloud the vision.

Consequently, there are two phenomena, namely glistening and calcification, that are undesired and occur in the case of excessively low or excessively high hydrophilicity of the polymeric material respectively.

The object of the present invention is the provision of a suitable polymeric material containing specific photoactive polymerised monomers which is soft and shapable at an ambient temperature between 16° C. and 18° C. and exhibits little glistening or no glistening and at the same time is sufficiently hydrophobic that calcification cannot occur, and the corresponding composition which is suitable for the preparation of this material. The polymeric material should additionally be transparent and change its refractive index on exposure to select light of a wavelength λ, for example on use of a UV light source of corresponding wavelength λ or on use of a laser having a sufficiently high pulse frequency whose emitted light has wavelength 2λ or even n λ, where n is a natural number. Furthermore, the polymeric material and the corresponding ophthalmological lens comprising the polymeric material should have unfolding times of less than 60 seconds, preferably from 10 to 40 seconds, particularly preferably from 15 to 25 seconds, in an aqueous environment at 35° C. Unfolding times of known materials are described, for example, in "The Ophthalmologist, 2017, Issue #1217".

The specific photoactive monomers are known, for example, from WO 2017/032442 bekannt.

The object is correspondingly achieved by the independent and dependent claims of the present patent application.

SUMMARY OF THE INVENTION

It has been found that a suitable choice of monomers in a composition comprising specific photoactive monomers leads to the preparation of a crosslinked transparent copolymer which changes its refractive index due to exposure to light of corresponding wavelength, has no or virtually no glistening and which, without further hydration, is soft at an ambient temperature between 16° C. and 18° C., so that it can be implanted into an eye, for example in the form of an intraocular lens, by means of standard applicators in accordance with the prior art. In addition, the polymeric material is transparent and changes its refractive index on exposure to light of a corresponding wavelength λ, for example on use of a UV light source of corresponding wavelength λ or on use of a laser having a sufficiently high pulse frequency whose emitted light has wavelength 2λ or n λ. The intraocular lenses produced from the crosslinked transparent copolymer have advantageous unfolding times.

The material preferably has no glistening. The term "no or virtually no glistening" means that the copolymer is always clear and the vacuole number in accordance with the glistening test, as described here and in Clinical Ophthalmology, 2013, 7, 1529-1534, is below 100 vacuoles/mm$^3$, preferably below 25 vacuoles/mm$^3$, particularly preferably below 20 vacuoles/mm$^3$ and very particularly preferably below 10 vacuoles/mm$^3$ or below 5 vacuoles/mm$^3$; these values correspond to scale 0 which was introduced by Akira Miyata. Miyata et al, Jpn J Ophthalmol 2001, 45, 564-569, describe scale 0 with below 50 vacuoles/mm$^3$, the limit of scale 1 with 50 vacuoles/mm$^3$, the limit of scale 2 with 100 vacuoles/mm$^3$ and the limit of scale 3 with 200 vacuoles/mm$^3$.

The invention therefore relates firstly to a composition comprising specific photoactive monomers of the formula (1), as described below, at least one hydrophilic monomer whose uncrosslinked homopolymer is water-soluble or swellable in water, a UV absorber and a crosslinker, where the molar ratio of the sum of all compounds of the formula (1) to the sum of all hydrophilic monomers is 1:0.51 to 1:1.24.

The invention furthermore relates to the use of the composition for the preparation of a corresponding copolymer or for the production of a blank for an ophthalmic lens or an ophthalmological implant.

The invention furthermore relates to the correspondingly crosslinked copolymer, to a process for the preparation of a copolymer of this type and to the use thereof for the production of an article, preferably a blank for an ophthalmic lens, a blank for an ophthalmological implant, an ophthalmic lens or an ophthalmological implant.

The invention furthermore relates to the corresponding article and to the process for the production of the article.

DESCRIPTION OF THE INVENTION

The invention therefore relates firstly to a composition comprising at least one compound of the formula (1)

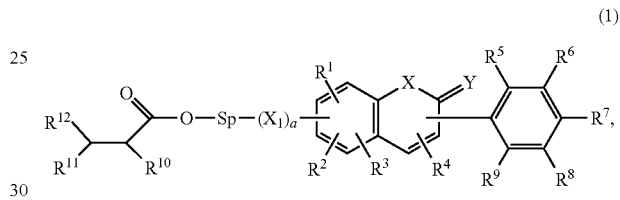

(1)

where the following applies to the symbols and indices used:
X is on each occurrence, identically or differently, O, S or NR$^0$;
Y is on each occurrence, identically or differently, O or S;
X$_1$ is O or S;
a is 0 or 1;
Sp is an alkanediyl, alkenediyl or alkanediyl, which may be substituted by one or more groups R;
R$^0$ is a straight-chain or branched alkyl group having 1 to 10 C atoms;
R$^1$, R$^2$, R$^3$ and R$^4$ are in each case, independently of one another on each occurrence, H, F, Cl, Br, I, a straight-chain or branched alkyl group having 1 to 20 C atoms, a partially or fully halogenated straight-chain or branched alkyl group having 1 to 20 C atoms or an aryl or heteroaryl group having 5 to 40 ring atoms;
R$^5$, R$^6$, R$^7$, R$^8$ and R$^9$ are in each case, independently of one another on each occurrence, H, F, Cl, Br, I, a straight-chain or branched alkyl group having 1 to 20 C atoms, a straight-chain or branched alkoxy group having 1 to 20 C atoms, a partially or fully halogenated straight-chain or branched alkyl group having 1 to 20 C atoms, a partially or fully halogenated straight-chain or branched alkoxy group having 1 to 20 C atoms or an aryl or heteroaryl group having 5 to 40 ring atoms, where at least one radical from the group of substituents R$^5$ to R$^9$ denotes a straight-chain or branched alkyl group having 1 to 20 C atoms, which may be partially or fully halogenated;
R$^{10}$, R$^{11}$, R$^{12}$ are in each case, independently of one another on each occurrence, H, F, a linear or branched alkyl group having 1 to 20 C atoms, which may be partially or fully halogenated, or an aryl group having 6 to 14 C atoms;
R is selected on each occurrence, identically or differently, from the group consisting of a straight-chain or branched alkyl group having 1 to 10 C atoms, a partially halogenated or fully halogenated straight-chain or branched alkyl group having 1 to 10 C atoms, a straight-chain or branched alkoxy group having 1 to 10 C atoms or a partially halogenated or fully halogenated straight-chain or branched alkoxy group having 1 to 10 C atoms;

at least one hydrophilic monomer whose uncrosslinked homopolymer is water-soluble or swellable in water;

at least one UV absorber and at least one crosslinker, where the molar ratio of the sum of all compounds of the formula (1) to the sum of all hydrophilic monomers is 1:0.51 to 1:1.24.

The term composition is used below synonymously for the term formulation or preparation.

The composition can include or comprise, essentially consist of or consist of the said requisite or optional constituents. All compounds or components which can be used in the compositions are either known and commercially available or can be synthesised by known processes, as described, for example, for the compounds of the formula (1) in WO 2017/032442, pages 21 and 22 and pages 44 to 78. Document WO 2017/032442 is hereby incorporated into the description by way of reference.

The compounds of the formula (1) and the preferred embodiments thereof, as described below, include all stereoisomers or racemic mixtures.

In general, surfaces are divided into hydrophilic and hydrophobic surfaces on the basis of their contact angle with water. The following applies: 0°<contact angle<90° hydrophilic; contact angle>90° hydrophobic. The contact angle here is the result of surface structure and material (literature: Förch, R.; Schönherr, H.; Tobias, A.; Jenkins, A. See Appendix C. In *Surface Design: Applications in Bioscience and Nanotechnology*; Wiley-VCH: Weinheim, Germany, 2009; page 471). Since the division into hydrophilic and hydrophobic is intended to relate predominantly to the bulk properties of the polymers and the individual components thereof, the said division by means of contact angle is not appropriate.

For the division of intraocular lenses into hydrophilic and hydrophobic lenses, Bozukova et al indicate their water content as the division criterion.

If this water content is less than 10-20% by weight, it is a hydrophobic intraocular lens; if this water content is greater than 10-20% by weight, it is a hydrophilic intraocular lens (literature: Bozukova D, Pagnoulle C, Jêrome R, Jêrome C, (2010) Polymers in modern ophthalmic implants-Historical background and recent advances, Material Science and Engineering R 69:63-83). The water absorption of a material is the more appropriate decision criterion with respect to hydrophilicity and hydrophobicity for the polymers prepared in the context of this invention with respect to their area of application. For division of monomers into hydrophilic and hydrophobic monomers, it is useful in the context of this invention and the application aims thereof to use a division described by Bozukova et al: if a monomer gives a homopolymer which is either completely water-soluble or has a water absorption of greater than 10% by weight, this exhibits a hydrophilic property and is classified as hydrophilic monomer for the purposes of this invention. The hydrophilic property is caused by functional groups in the monomer which are capable of binding water molecules. The property can be confirmed in the swollen state by the presence of non-freezable water. The non-freezable water here is based on the fact that functional groups in the polymer bind water per se and this water is therefore not capable of forming ice crystals, irrespective of the temperature. Unaffected by this, a polymer of this type may also contain freezable water which forms ice crystals, but this is not utilised for the division into hydrophilic and hydrophobic monomers. Examples of functional groups which are capable of binding non-freezable water are, inter alia, hydroxyl groups, amino groups, ammonium groups, carboxyl groups, sulfone groups, sulfate groups, ether bridges or amide groups. The presence of functional groups of this type in a monomer is thus an indicator of a hydrophilic monomer.

Therefore, if a monomer satisfies one or more of the said criteria water solubility of the resultant homopolymer, water absorption of the resultant homopolymer greater than 10% by weight and/or presence of non-freezable water in the resultant homopolymer, this is a "hydrophilic monomer" for the purposes of the invention. If a monomer does not satisfy any of the said criteria, this is referred to as "non-hydrophilic monomer" for the purposes of the invention.

For the purposes of the present invention, a straight-chain or branched alkyl group having 1 to 20 C atoms is taken to mean the radicals methyl, ethyl, n-propyl, i-propyl, cyclopropyl, n-butyl, i-butyl, s-butyl, t-butyl, cyclobutyl, 2-methylbutyl, n-pentyl, s-pentyl, t-pentyl, 2-pentyl, neopentyl, cyclopentyl, n-hexyl, s-hexyl, t-hexyl, 2-hexyl, 3-hexyl, neohexyl, 2-methylpentyl, n-heptyl, 2-heptyl, 3-heptyl, 4-heptyl, n-octyl, 2-ethylhexyl, n-nonyl, n-decyl, 2-(2,6-dimethyl)octyl, 3-(3,7-dimethyl)octyl, 1,1-dimethyl-n-hex-1-yl-, 1,1-dimethyl-n-hept-1-yl-, 1,1-dimethyl-n-oct-1-yl-, n-undecyl, n-dodecyl, 1,1-dimethyl-n-dec-1-yl-, n-tridecyl, n-tetradecyl, 1,1-dimethyl-n-dodec-1-yl-, n-heptadecyl, n-hexadecyl, 1,1-dimethyl-n-tetradec-1-yl-, n-octadecyl, n-nonadecyl, 1,1-dimethyl-n-hexadec-1-yl-, 1,1-dimethyl-n-octadec-1-yl-, 1,1-diethyl-n-hex-1-yl-, 1,1-diethyl-n-hept-1-yl-, 1,1-diethyl-n-oct-1-yl-, 1,1-diethyl-n-dec-1-yl-, 1,1-diethyl-n-dodec-1-yl-, 1,1-diethyl-n-tetradec-1-yl-, 1,1-diethyl-n-hexadec-1-yl-, 1,1-diethyl-n-octadec-1-yl- and n-eicosyl.

Partially halogenated alkyl groups correspond to the straight-chain or branched alkyl groups having 1 to 20 C atoms, as described above, in which at least one H atom has been replaced by a halogen atom, but not all H atoms have been replaced by halogen atoms. Preferred halogen atoms are F atoms or Cl atoms, particularly preferably partially fluorinated alkyl groups, for example 2,2,2-trifluoroethyl.

Fully halogenated alkyl groups correspond to the straight-chain or branched alkyl groups having 1 to 20 C atoms, as described above, in which all H atoms have been replaced by the corresponding halogen atom. Preferred halogen atoms are F atoms or Cl atoms, particularly preferably fully fluorinated alkyl groups. Examples thereof are trifluoromethyl, pentafluoroethyl or nonafluorobutyl.

For the purposes of the present invention, alkanediyl corresponds to a divalent group derived from a straight-chain or branched alkyl group having 1 to 20 C atoms, as described above.

The purposes of the present invention, alkenediyl corresponds to a divalent group derived from a straight-chain or branched alkenyl group having 1 to 20 C atoms which corresponds to a straight-chain or branched alkyl group having 1 to 20 C atoms, as described above, but contains at least one double bond.

For the purposes of the present invention, alkynediyl corresponds to a divalent group derived from a straight-chain or branched alkynyl group having 1 to 20 C atoms which corresponds to a straight-chain or branched alkyl group having 1 to 20 C atoms, as described above, but contains at least one triple bond.

Alkanediyl, alkenediyl or alkynediyl can correspondingly be substituted by one or more radicals R.

For the purposes of the present invention, a partially halogenated or fully halogenated straight-chain or branched alkoxy group having 1 to 20 C atoms corresponds to a partially halogenated or fully halogenated straight-chain or branched alkyl group having 1 to 20 C atoms, where the alkyl group described above is correspondingly bonded to an O atom and can be abbreviated to O-alkyl.

For the purposes of the present invention, a straight-chain or branched thio-alkyl group having 1 to 20 C atoms corresponds to a straight-chain or branched alkyl group having 1 to 20 C atoms, where the alkyl group described above is correspondingly bonded to an S atom and can be abbreviated to S-alkyl.

A cycloalkyl group containing 3 to 8 C atoms is, for example, cyclopropyl, cyclobutyl, cyclopentyl, cyclohexyl, cycloheptyl and cyclooctyl, which may also in each case be substituted by a radical R.

An aryl group in the sense of this invention contains 6 to 40 aromatic ring atoms, preferably C atoms. A heteroaryl group in the sense of this invention contains 5 to 40 aromatic ring atoms, where the ring atoms include C atoms and at least one heteroatom, with the proviso that the sum of C atoms and heteroatoms is at least 5. The heteroatoms are preferably selected from N, O and/or S. An aryl group or heteroaryl group is taken to mean either a simple aromatic ring, i.e. phenyl, derived from benzene, or a simple heteroaromatic ring, for example derived from pyridine, pyrimidine or thiophene, or a condensed aryl or heteroaryl group, for example naphthalene, anthra-cene, phenanthrene, quinoline or isoquinoline.

An aryl or heteroaryl group having 5-40 ring atoms, which may also in each case be substituted by a radical R and which may be linked via any desired positions on the aromatic or heteroaromatic group, are taken to mean, for example, the following groups benzene, naphthalene, anthra-cene, benzanthracene, phenanthrene, benzophenanthrene, pyrene, chrysene, perylene, fluoranthene, benzofluoranthene, naphthacene, pentacene, benzopyrene, biphenyl, biphenylene, terphenyl, terphenylene, fluorene, spirobifluorene, dihydrophenanthrene, dihydropyrene, tetra-hydropyrene, cis- or trans-indenofluorene, cis- or trans-monobenzoindenofluorene, cis- or trans-dibenzoindenofluorene, truxene, isotruxene, spirotruxene, spiroiso-truxene, furan, benzofuran, isobenzofuran, dibenzofuran, thiophene, benzo-thiophene, isobenzothiophene, dibenzothiophene, pyrrole, indole, isoindole, carbazole, indolocarbazole, indenocarbazole, pyridine, quinoline, isoquinoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenanthrimidazole, pyridimid-azole, pyrazinimidazole, quinoxalinimidazole, oxazole, benzoxazole, naphthoxazole, anthroxazole, phenanthroxazole, isoxazole, 1,2-thiazole, 1,3-thiazole, benzothiazole, pyridazine, benzopyridazine, pyrimidine, benzo-pyrimidine, quinoxaline, 1,5-diazaanthracene, 2,7-diazapyrene, 2,3-diazapyrene, 1,6-diazapyrene, 1,8-diazapyrene, 4,5-diazapyrene, 4,5,9,10-tetraazaperylene, pyrazine, phenazine, phenoxazine, phenothiazine, fluorubin, naphthyridine, azacarbazole, benzocarboline, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole, 1,2,4,5-tetrazine, 1,2,3,4-tetrazine, 1,2,3,5-tetrazine, purine, pteridine, indolizine and benzothiadiazole.

An arylalkyl group is an alkyl group which is substituted by at least one aryl group.

An alkylarylalkyl group is an alkyl group which is substituted by at least one aryl group, where the aryl group is substituted by at least one alkyl group. The meanings or preferred meanings given above apply to aryl and alkyl groups.

For the purposes of the invention, R is selected on each occurrence, identically or differently, from the group consisting of a straight-chain or branched alkyl group having 1 to 10 C atoms, a partially halogenated or fully halogenated straight-chain or branched alkyl group having 1 to 10 C atoms, a straight-chain or branched alkoxy group having 1 to 10 C atoms or a partially halogenated or fully halogenated straight-chain or branched alkoxy group having 1 to 10 C atoms. R is preferably on each occurrence methyl, ethyl, trifluoromethyl or methoxy.

For the purposes of the invention, $R^0$ is a straight-chain or branched alkyl group having 1 to 10 C atoms, preferably a straight-chain or branched alkyl group having 1 to 4 C atoms.

In an embodiment of the invention, compounds of the formula (1) in which Y has the meaning O and X has the meaning O, S or $NR^0$, where $R^0$ has a meaning indicated above, are preferably selected for the composition according to the invention.

Compounds of the formula (1) in which Y has the meaning O and X has the meaning O or S, preferably in which Y has the meaning O and X has the meaning O, are furthermore preferably selected for the composition according to the invention. Particularly preferred compounds of the formula (1) of this type can be represented by the formula (2),

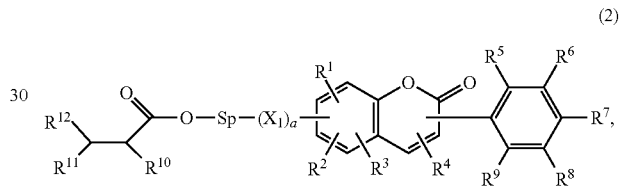

(2)

where $X_1$, a, Sp, $R^1$ to $R^{12}$ have a meaning given above or preferably given below.

In compounds of the formula (1) or (2), as described above, $X_1$ is preferably O and a corresponds to 0 or 1. If the spacer Sp has an even number of C atoms, a is preferably 1. If the spacer Sp as an odd number of C atoms, a is preferably 0.

In compounds of the formula (1) or (2), as described above or preferably described, Sp is preferably an alkanediyl having 6 to 20 C atoms, which may be substituted by one or more R, particularly preferably an alkanediyl having 8, 9, 10, 11, 12, 13, 14, 15 or 16 C atoms, which may be substituted by one or more R, very particularly preferably an alkanediyl having 9, 10, 11, 12, 13 or 14 C atoms, which may be substituted by one or more R. The alkanediyl, as described above, is preferably unsubstituted. The alkanediyl is very particularly preferably an alkanediyl having 10, 11, 12 or 13 C atoms or —$(CH_2)_{11}$— and —$(CH_2)_{12}$—.

In compounds of the formula (1) or (2), as described above or preferably described, the substituents $R^1$, $R^2$, $R^3$ and $R^4$ are preferably H, which can be represented by compounds of formula (3),

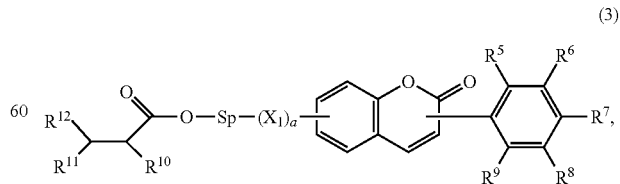

(3)

where $X_1$, a, Sp, $R^5$ to $R^{12}$ have a meaning given above or a meaning preferably given above or below.

In an embodiment of the invention, compounds of the formula (1), (2) or (3), as described above or described as preferred, where the substituents $R^{11}$ and $R^{12}$ denote H and $R^{10}$ has a meaning indicated above are preferably selected for the composition according to the invention.

The substituent $R^{10}$ is preferably H or a straight-chain or branched alkyl group having 1, 2, 3, 4, 5 or 6 C atoms or a phenyl group which is unsubstituted or mono- or polysubstituted by R. The substituent $R^{10}$ in compounds of the formula (1), (2) or (3) is particularly preferably H, methyl, ethyl or phenyl, very particularly preferably H or methyl.

If the substituent $R^{10}$ in compounds of the formula (1), (2) or (3), as described above, is H, these monomers are then referred to as acrylates.

If the substituent $R^{10}$ in compounds of the formula (1), (2) or (3), as described above, is methyl, these monomers are then referred to as methacrylates. Acrylates are particularly preferred.

In compounds of the formula (1), (2) and (3), as described above or described as preferred, the substituents $R^{11}$, $R^{12}$, $R^5$, $R^6$ and $R^8$ are preferably H, which can be represented by compounds of the formula (4),

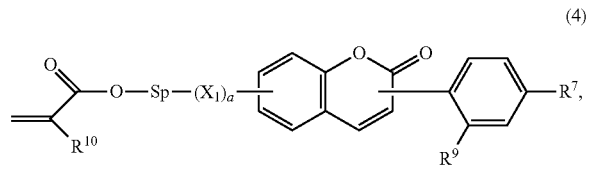

(4)

where $X_1$, a, Sp, $R^7$, $R^8$ and $R^{12}$ have a meaning given above or a meaning preferably given above or below.

In compounds of the formula (1), (2), (3) or (4), $R^9$ is preferably an unfluorinated, partially fluorinated or fully fluorinated straight-chain or branched alkyl or alkoxy group having 1 to 6 C atoms, where Sp, $X_1$, a, $R^7$ and $R^{10}$ or one of the other substituents $R^1$ to $R^{12}$ if they appear have a meaning given above or preferred meaning.

In compounds of the formula (1), (2), (3) or (4), $R^9$ is particularly preferably an unfluorinated, partially fluorinated or fully fluorinated straight-chain or branched alkyl or alkoxy group having 1 to 4 C atoms, where Sp, $X_1$, a, $R^7$ and $R^{10}$ or one of the other substituents $R^1$ to $R^{12}$ if they appear have a meaning given above or preferred meaning.

In compounds of the formula (1), (2), (3) or (4), $R^7$ is preferably an unfluorinated, partially fluorinated or fully fluorinated straight-chain or branched alkyl group having 2 to 8 C atoms, where Sp, $X_1$, a, $R^9$ and $R^{10}$ or one of the other substituents $R^1$ to $R^{12}$ if they appear have a meaning given above or preferred meaning.

In compounds of the formula (1), (2), (3) or (4), $R^7$ is particularly preferably an unfluorinated, partially fluorinated or fully fluorinated straight-chain or branched alkyl group having 3 to 8 C atoms, where Sp, $X_1$, a, $R^9$ and $R^{10}$ or one of the other substituents $R^1$ to $R^{12}$ if they appear have a meaning given above or preferred meaning.

Preferred examples of the compounds of the formula (1) to (4) which are selected in accordance with the invention for the composition correspond to the compounds (M-1) to (M-63):

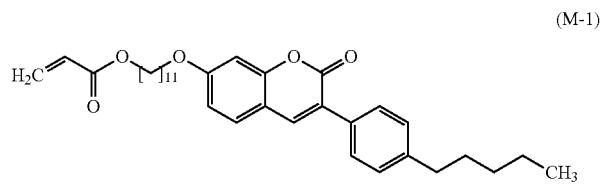

(M-1)

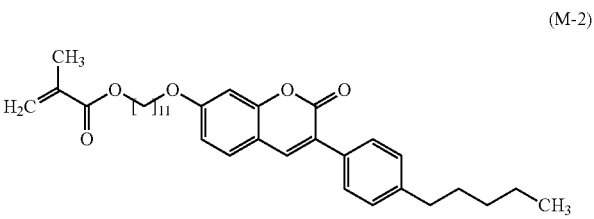

(M-2)

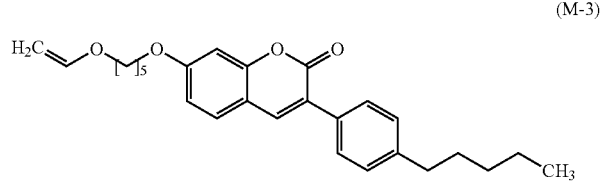

(M-3)

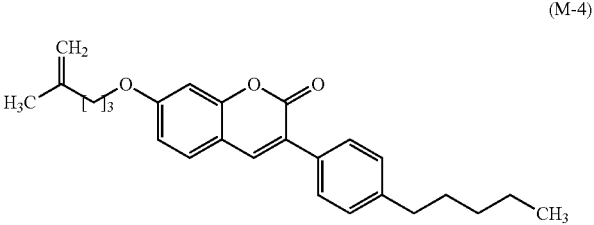

(M-4)

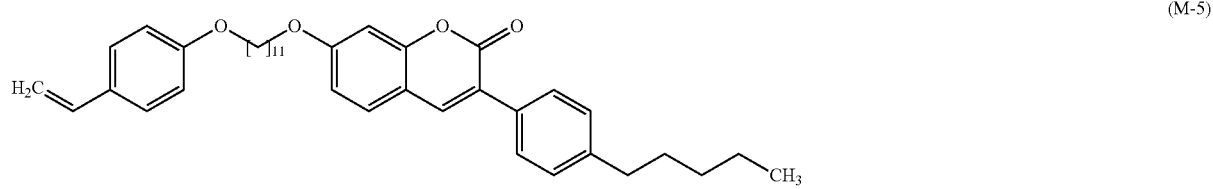

(M-5)

-continued
(M-6)
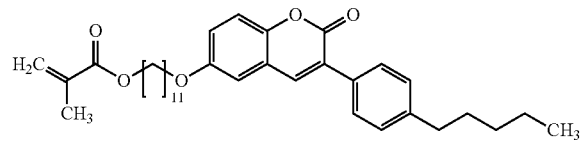
(M-7)
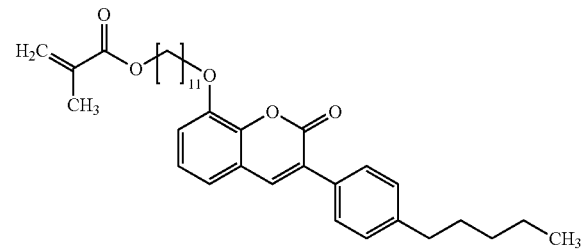
(M-8)
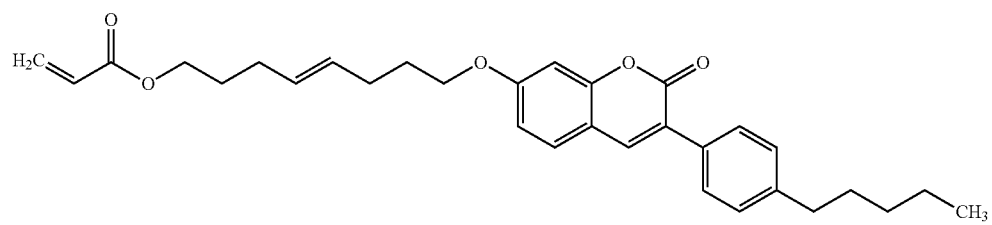
(M-9)
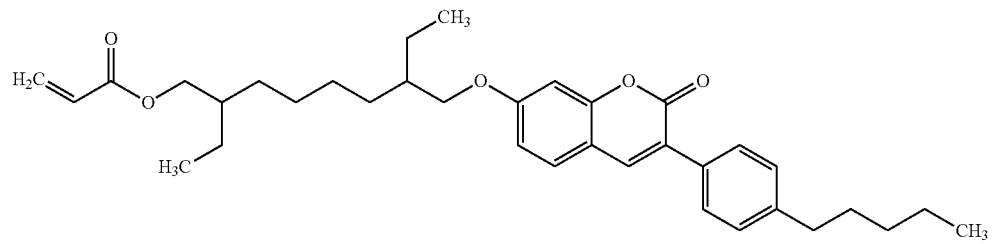
(M-10)
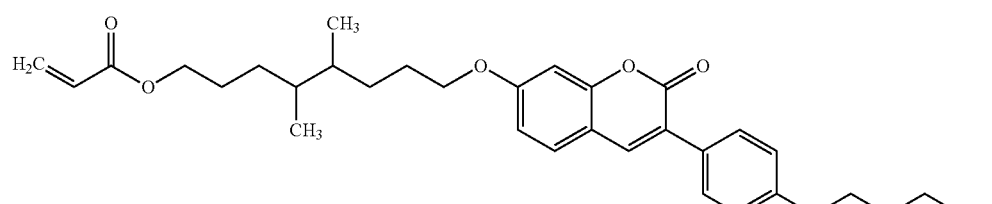
(M-11)
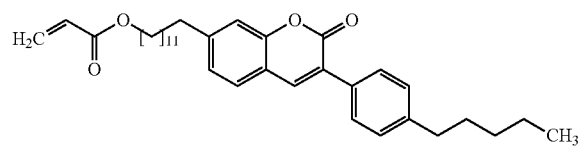
(M-12)
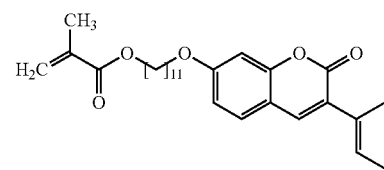
(M-13)
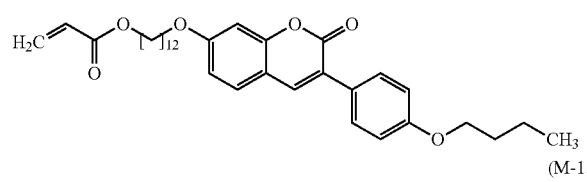
(M-14)
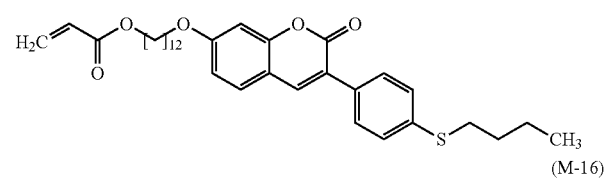
(M-15)
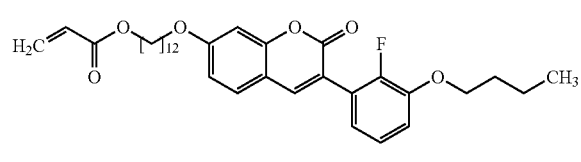
(M-16)
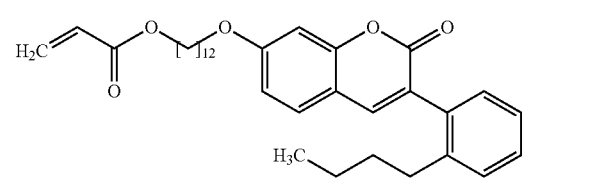

-continued
(M-17)
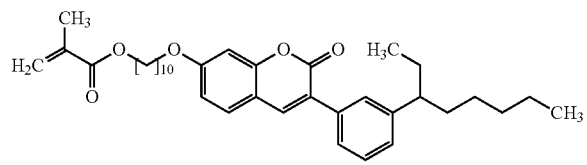
(M-18)
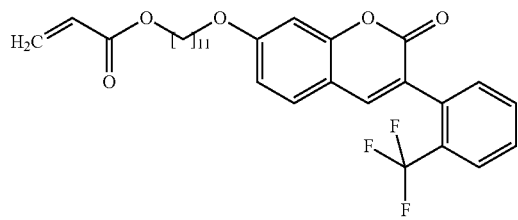
(M-19)
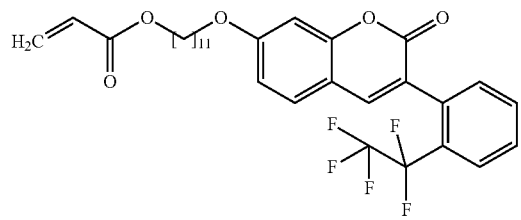
(M-20)
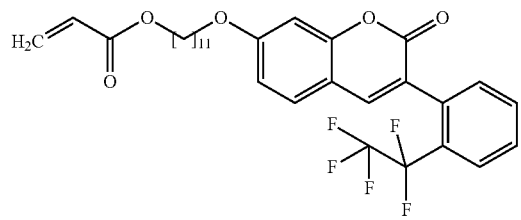
(M-21)
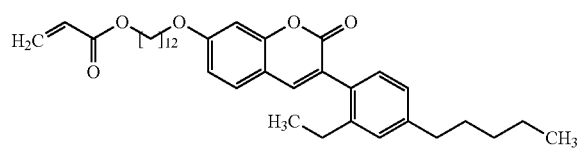
(M-22)
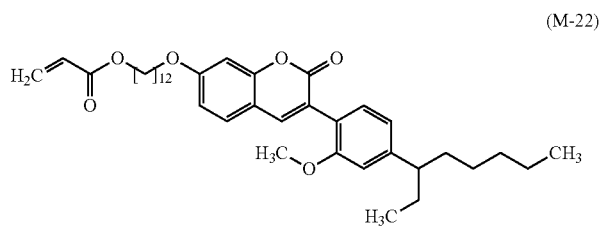
(M-23)
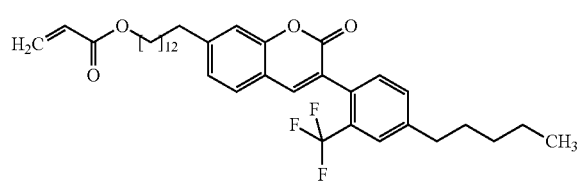
(M-24)
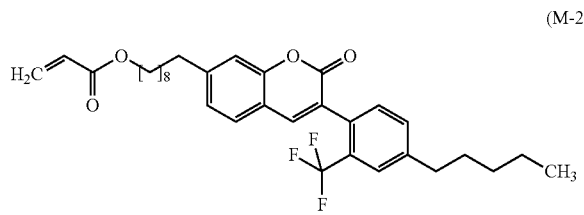
(M-25)
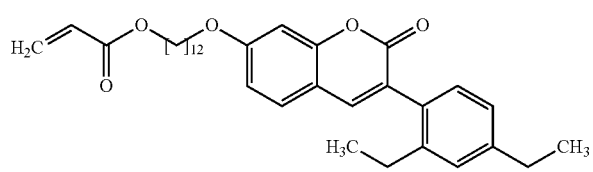
(M-26)
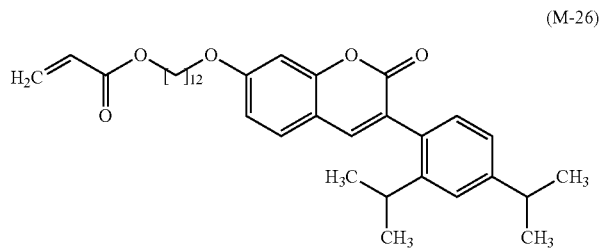
(M-27)
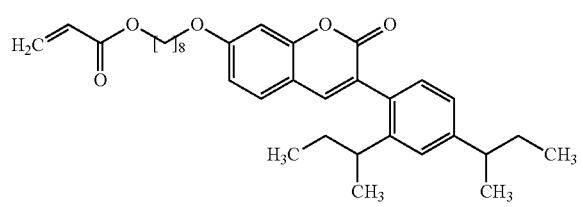
(M-28)
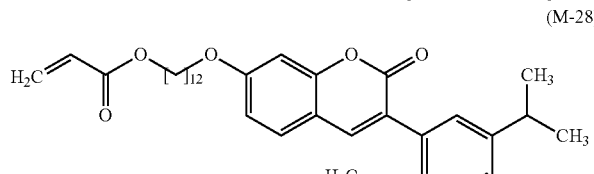
(M-29)
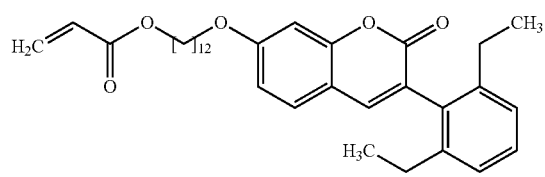
(M-30)
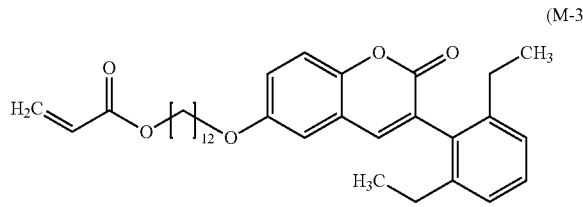

-continued
(M-31) 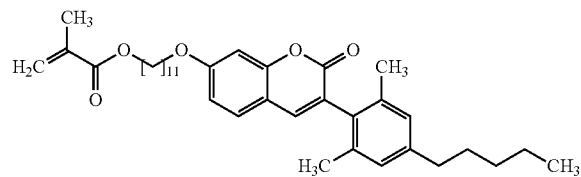
(M-32) 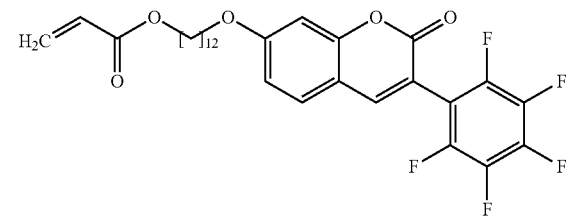
(M-33) 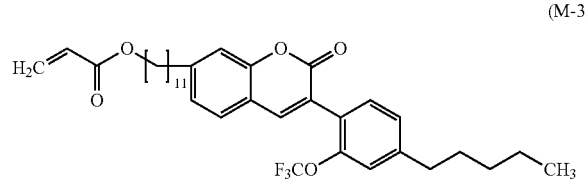
(M-34) 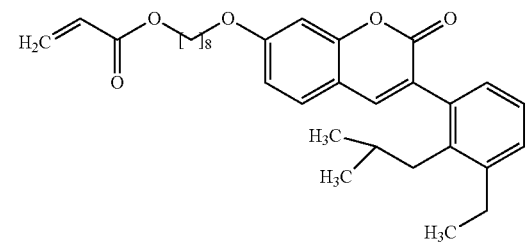
(M-35) 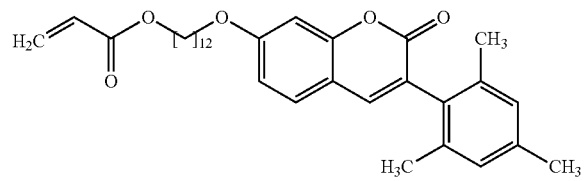
(M-36) 
(M-37) 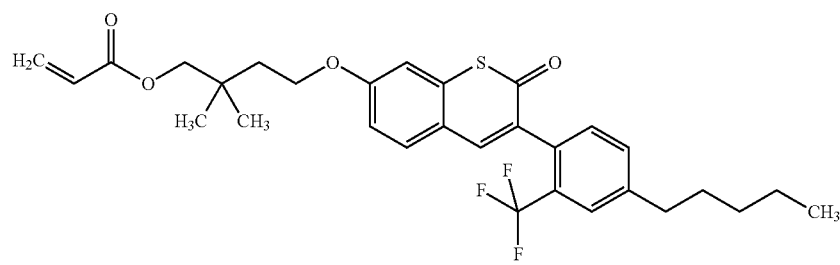
(M-38) 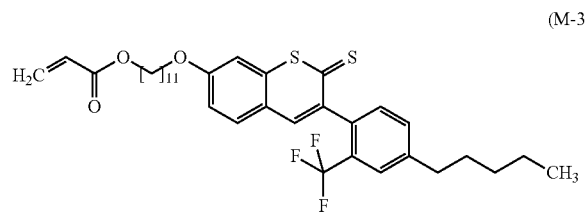
(M-39) 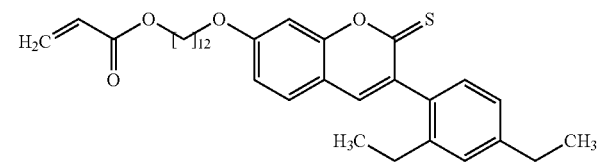
(M-40) 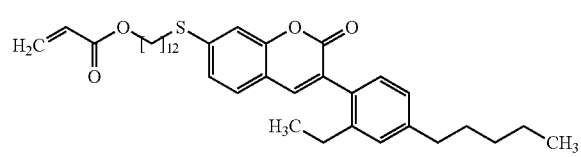
(M-41) 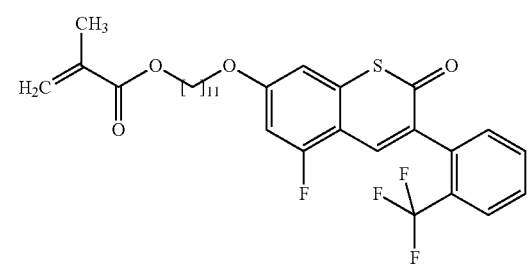

-continued
(M-42)
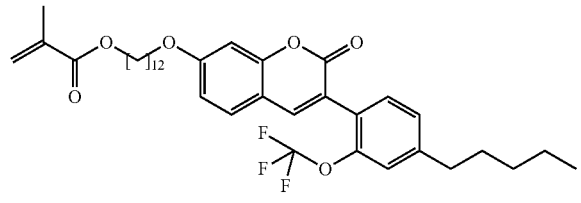
(M-43)
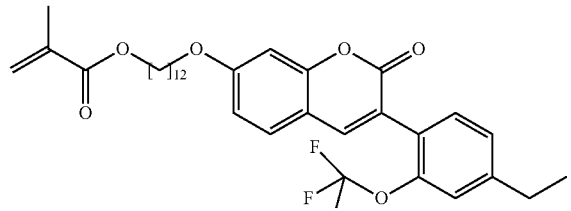
(M-44)
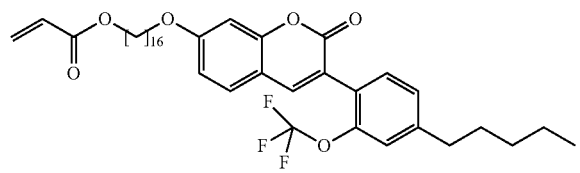
(M-45)
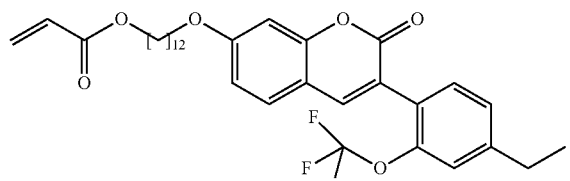
(M-46)
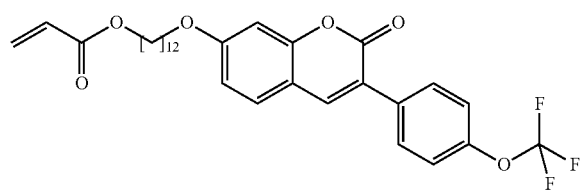
(M-47)
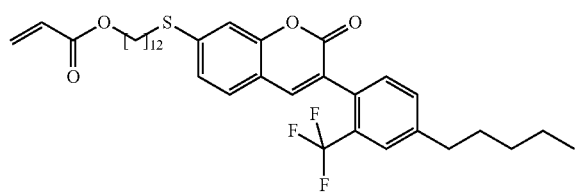
(M-48)
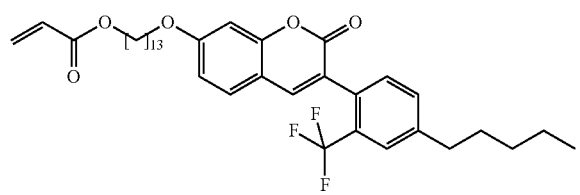
(M-49)
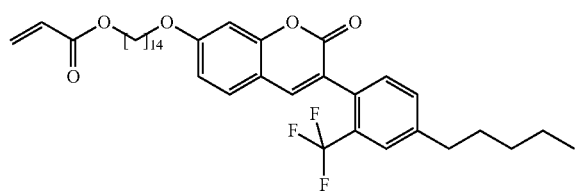
(M-50)
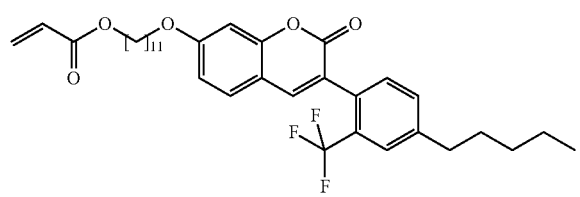
(M-51)
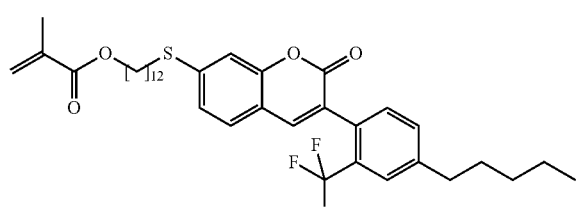
(M-52)
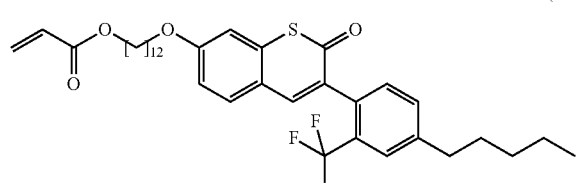
(M-53)
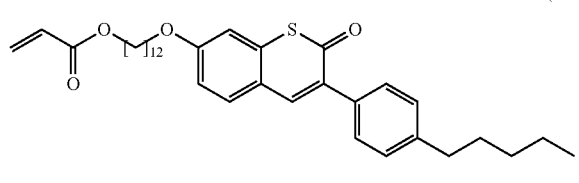
(M-54)
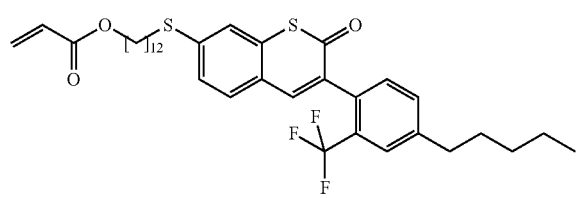
(M-55)

-continued

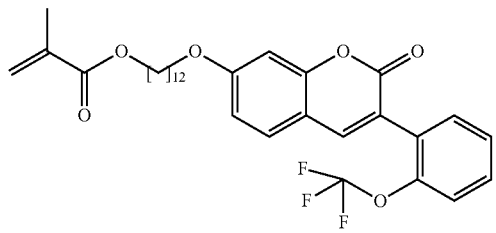
(M-56)

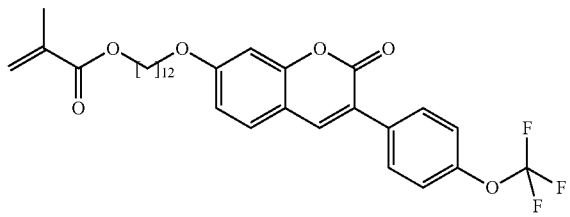
(M-57)

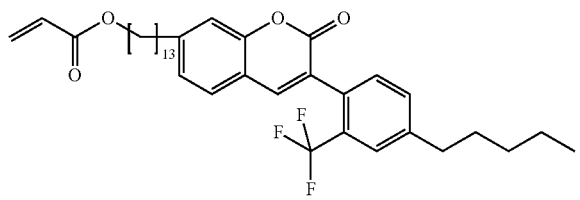
(M-58)

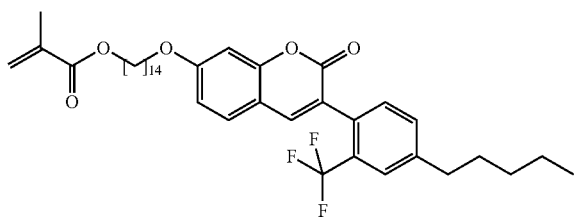
(M-59)

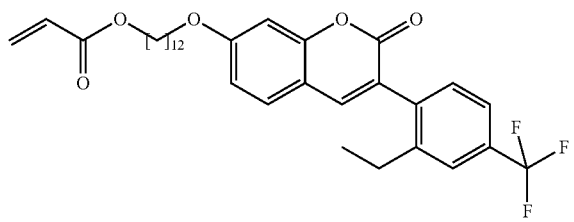
(M-60)

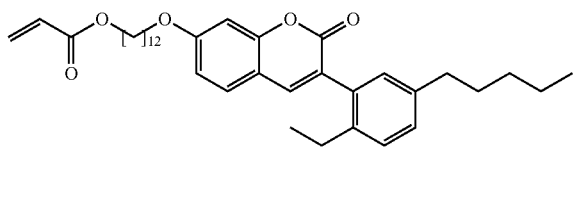
(M-61)

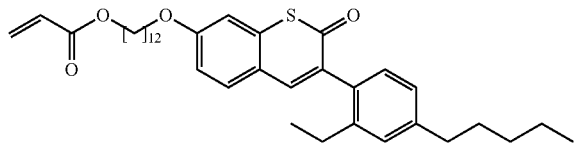
(M-62)

Besides one or more compounds of the formula (1), (2), (3), (4), as described above or preferably described or the compounds (M-1) to (M-63), the composition according to the invention also comprises at least one hydrophilic monomer in the molar ratio as described above or preferably described below.

The hydrophilic monomer, as defined above, is, for example, characterised in that its corresponding homopolymer is soluble in water or swellable in water. It is distinguished by the presence of polar groups which are able to coordinate water, for example and preferably OH or $NH_2$ groups.

Suitable examples of hydrophilic monomers are 3-hydroxypropyl methacrylate, 3-hydroxypropyl acrylate, 2-hydroxyethyl methacrylate, 2-hydroxyethyl acrylate, 4-hydroxybutyl methacrylate, 4-hydroxybutyl acrylate, glyceryl methacrylate, glyceryl acrylate, acrylamide, N-vinylpyrrolidone, 6-hydroxyhexyl methacrylate, 6-hydroxyhexyl acrylate, 18-hydroxyoctadecyl methacrylate, 18-hydroxyoctadecyl acrylate, 11-hydroxyundecyl methacrylate, 11-hydroxyundecyl acrylate, 12-hydroxydodecyl methacrylate or 12-hydroxydodecyl acrylate or a combination of these compounds. The hydrophilic monomer for the hydrophilic monomers are preferably selected from acrylate or methacrylate monomers from the above-mentioned group.

Preferred hydrophilic monomers are n-hydroxyalkyl acrylates and n-hydroxyalkyl methacrylates having 1 to 4 C atoms in der alkyl chain.

2-Hydroxyethyl methacrylate (HEMA), 2-hydroxyethyl acrylate (HEA) or a mixture of these monomers are particularly preferably selected for the composition according to the invention.

The invention accordingly furthermore relates to a composition, as described above or preferably described below, in which the at least one hydrophilic monomer is selected from 3-hyroxypropyl methacrylate, 3-hydroxypropyl acrylate, 2-hydroxyethyl methacrylate, 2-hydroxyethyl acrylate, 4-hydroxybutyl methacrylate, 4-hydroxybutyl acrylate, glyceryl methacrylate, glyceryl acrylate, acrylamide, N-vinylpyrrolidone, 6-hydroxyhexyl methacrylate, 6-hydroxyhexyl acrylate, 18-hydroxyoctadecyl methacrylate, 18-hydroxyoctadecyl acrylate, 11-hydroxyundecyl methacrylate, 11-hydroxyundecyl acrylate, 12-hydroxydodecyl methacrylate, 12-hydroxydodecyl acrylate, ethylene glycol phenyl ether acrylate, ethylene glycol phenyl ether methacrylate or a combination of these compounds.

Besides one or more compounds of the formula (1), (2), (3), (4), as described above or preferably described or the compounds (M-1) to (M-63), the composition according to the invention also comprises a hydrophilic monomer or a combination of hydrophilic monomers, as described above, where the molar ratio of the sum of all compounds of the formula (1) or the preferred compounds of the formula (1) to the sum of all hydrophilic monomers is preferably 1:0.56 to 1:1.2 or particularly preferably 1:0.6 to 1:1.

Besides one or more compounds of the formula (1), (2), (3), (4), as described above or preferably described or the compounds (M-1) to (M-63) and the hydrophilic monomers, as described above, in the said molar ratios, the composition according to the invention may comprise at least one further non-hydrophilic monomer which does not conform to the formula (1) and/or at least one blue absorber.

The invention therefore furthermore relates to the composition, as described above or preferably described, characterised in that it comprises at least one further non-hydrophilic monomer which does not conform to the formula (1) or a preferred embodiment of the compounds of formula (1).

The invention therefore furthermore relates to the composition, as described above or preferably described, characterised in that it comprises at least one blue absorber.

Suitable blue absorbers are substances which exhibit absorption in the blue wavelength region of visible light. A blue absorber which is likewise an acrylate or a methacrylate and is available as further monomer during the polymerisation is preferably selected. Suitable blue absorbers are known from the literature, for example from WO 2012/167124. A particularly preferred blue absorber is N-2-[3-(2'-methylphenylazo)-4-hydroxyphenylethyl]-ethylmethacrylamide. They can be added to the composition according to the invention in order that the polymerised composition is also able to filter short-wave visible light in addition to the UV light in order thus to protect the retina better if the material is used for the production of an ophthalmological product.

The non-hydrophilic monomer or the non-hydrophilic monomers which do(es) not conform to the formula (1) or a preferred embodiment of the compounds of the formula (1) can be added for further optimisation of the composition and the corresponding resultant copolymer. This is a polymerisable substance which carries further unsubstituted or substituted aliphatic radicals and/or unsubstituted or substituted aromatic radicals and/or sulfide bonds and/or fluorinated radicals. If a substituted aliphatic or aromatic radical is selected, these are preferably substituted by at least one substituent R #, where R # on each occurrence, independently of one another, denotes F, Cl, Br, I, a straight-chain or branched alkyl group having 1 to 20 C atoms, a straight-chain or branched alkoxy group having 1 to 20 C atoms, a partially or fully halogenated straight-chain or branched alkyl group having 1 to 20 C atoms, a partially or fully halogenated straight-chain or branched alkoxy group having 1 to 20 C atoms, a cycloalkyl group having 5 to 8 C atoms, an arylalkoxy group having 7 to 20 C atoms or an aryl or heteroaryl group having 5 to 40 ring atoms, where the aryl or heteroaryl group or the aryl group as part of the arylalkoxy group may be substituted by a straight-chain or branched alkyl group having 1 to 12 C atoms or a cycloalkyl group having 5 to 8 C atoms.

Examples of non-hydrophilic monomers are: n-butyl acrylate, n-butyl methacrylate, ethyl methacrylate, ethyl acrylate, methyl methacrylate, methyl acrylate, n-propyl methacrylate, n-propyl acrylate, isopropyl methacrylate, isopropyl acrylate, n-pentyl acrylate, n-pentyl methacrylate, isopentyl methacrylate, isopentyl acrylate, s-butyl acrylate, s-butyl methacrylate, n-hexyl acrylate, n-hexyl methacrylate, s-pentyl acrylate, s-pentyl methacrylate, isohexyl acrylate, isohexyl methacrylate, n-octyl acrylate, n-octyl methacrylate, isooctyl acrylate, isooctyl methacrylate, n-nonyl acrylate, n-nonyl methacrylate, n-decyl acrylate, n-decyl methacrylate, n-undecyl acrylate, n-undecyl methacrylate, n-dodecyl acrylate, n-dodecyl methacrylate, n-octadecyl acrylate, n-octadecyl methacrylate, 2-ethylhexyl acrylate, 2-ethylhexyl methacrylate, n-dodecyl acrylate, n-dodecyl methacrylate, n-tridecyl acrylate, n-tridecyl methacrylate, n-tetradecyl acrylate, n-tetradecyl methacrylate, n-pentadecyl acrylate, n-pentadecyl methacrylate, n-hexadecyl acrylate, n-hexadecyl methacrylate, 2,2-dimethylpropyl acrylate, 2,2-dimethylpropyl methacrylate, trimethylcyclohexyl acrylate, trimethylcyclohexyl methacrylate, isobutyl acrylate, isobutyl methacrylate, 2-(4-bromophenyl)-ethyl methacrylate, 4-phenylbutyl methacrylate, 4-methylphenyl methacrylate, phenyl methacrylate, 4-methylphenyl acrylate, benzyl acrylate, benzyl methacrylate, 2-benzyloxyethyl methacrylate, 3-benzyloxypropyl methacrylate, phenylethyl acrylate, phenylethyl methacrylate, 3-phenylpropyl methacrylate, 2-phenoxyethyl acrylate, 2-benzyloxyethyl acrylate, 3-phenylpropyl acrylate, 4-methylbenzyl acrylate, phenyl acrylate, 2-(phenyl-thio)ethyl methacrylate, 4-phenylbutyl acrylate, 5-phenylpentyl acrylate, 3-benzyloxypropyl acrylate, 2-(phenylthio)propyl acrylate, 2-(phenylthio)ethyl acrylate, 4-phenylbutyl acrylate, 4-methylbenzyl methacrylate, 2-(2-methyl-phenyl)ethyl acrylate, 2-(2-methylphenyl)ethyl methacrylate, 2-(3-methyl-phenyl)ethyl acrylate, 2-(3-methylphenyl)ethyl methacrylate, 2-(4-methyl-phenyl)ethyl acrylate, 2-(4-methylphenyl)ethyl methacrylate, 2-(4-propyl-phenyl)ethyl acrylate, 2-(4-propylphenyl)ethyl methacrylate, 2-(4-(1-methyl-ethyl)phenyl)ethyl acrylate, 2-(4-(1-methylethyl)phenyl)ethyl methacrylate, 2-(4-methoxyphenyl)ethyl methacrylate, 2-(4-methoxyphenyl)ethyl acrylate, 2-(4-cyclohexylphenyl)ethyl acrylate, 2-(4-cyclohexylphenyl)ethyl methacrylate, 2-(4-chlorophenyl)ethyl methacrylate, 2-(4-chlorophenyl)ethyl acrylate, 2-(3-chlorophenyl)ethyl methacrylate, 2-(3-chlorophenyl)ethyl acrylate, 2-(2-chlorophenyl)ethyl methacrylate, 2-(2-chlorophenyl)ethyl acrylate, 2-(4-bromophenyl)ethyl acrylate, 2-(4-phenylphenyl)ethyl methacrylate, 2-(4-phenylphenyl)ethyl acrylate, 2-(3-phenylphenyl)ethyl methacrylate, 2-(3-phenylphenyl)ethyl acrylate, 2-(4-benzylphenyl)ethyl methacrylate, 2-(4-benzylphenyl)ethyl acrylate, 2-(phenylthio)ethyl acrylate, 3-benzyloxypropyl acrylate, 2-[2-(benzyloxy)ethoxy]ethyl acrylate, 2-[2-(benzyloxy)ethoxy]ethyl methacrylate, pentafluorophenyl methacrylate, heptadecafluorodecyl methacrylate, dodecafluoroheptyl methacrylate, heptadecafluorodecyl acrylate, trifluoroethyl methacrylate, octafluoropentyl methacrylate, hexafluorobutyl methacrylate, octafluoropentyl acrylate, trifluoroethyl acrylate, heptafluorobutyl acrylate, tetrafluoropropyl methacrylate, hexafluorobutyl acrylate, pentafluorophenyl acrylate, hexafluoroisopropyl methacrylate.

Preferred non-hydrophilic monomers are phenoxyalkyl acrylates, phenoxyalkyl methacrylates, alkyl acrylates and alkyl methacrylates having a chain length of 8 to 20 C atoms, and phenylalkoxy acrylates, phenylalkoxy methacrylates, phenylalkoxyalkyl acrylates and phenylalkoxyalkyl methacrylates having a chain length of the alkylene or alkyloxy group 1 to 8 C atoms, which are preferably straight-chain.

n-Octadecyl methacrylate (C18MA) or 2-phenoxyethyl acrylate (EGPEA) or a combination of these compounds is particularly preferably selected as non-hydrophilic monomer. A synonymous name for 2-phenylethyl acrylate is ethylene glycol phenyl ether acrylate.

The invention furthermore relates to a composition, as described above or described as preferred, in which at least one non-hydrophilic monomer is selected from n-butyl acrylate, n-butyl methacrylate, ethyl methacrylate, ethyl acrylate, methyl methacrylate, methyl acrylate, n-propyl methacrylate, n-propyl acrylate, isopropyl methacrylate, isopropyl acrylate, n-pentyl acrylate, n-pentyl methacrylate, isopentyl methacrylate, isopentyl acrylate, s-butyl acrylate, s-butyl methacrylate, n-hexyl acrylate, n-hexyl methacrylate, s-pentyl acrylate, s-pentyl methacrylate, isohexyl acrylate, isohexyl methacrylate, n-octyl acrylate, n-octyl methacrylate, isooctyl acrylate, isooctyl methacrylate, n-nonyl acrylate, n-nonyl methacrylate, n-decyl acrylate, n-decyl methacrylate, n-undecyl acrylate, n-undecyl methacrylate, n-dodecyll acrylate, n-dodecyl methacrylate, n-octadecyl acrylate, n-octadecyl methacrylate, 2-ethylhexyl acrylate, 2-ethylhexyl methacrylate, n-dodecyl acrylate, n-dodecyl methacrylate, n-tridecyl acrylate, n-tridecyl methacrylate, n-tetradecyl acrylate, n-tetradecyl methacrylate, n-pentadecyl acrylate, n-pentadecyl methacrylate, n-hexadecyl acrylate, n-hexadecyl methacrylate, 2,2-dimethylpropyl acrylate, 2,2-dimethylpropyl methacrylate, trimethylcyclohexyl acrylate, trimethylcyclohexyl methacrylate, isobutyl acrylate, isobutyl methacrylate, 2-(4-bromophenyl)ethyl methacrylate, 4-phenylbutyl methacrylate, 4-methylphenyl methacrylate, phenyl methacrylate, 4-methyl-phenyl acrylate, benzyl acrylate, benzyl methacrylate, 2-benzyloxyethyl methacrylate, 3-benzyloxypropyl methacrylate, phenylethyl acrylate, phenylethyl methacrylate, 3-phenylpropyl methacrylate, 2-phenoxyethyl acrylate, 2-benzyloxyethyl acrylate, 3-phenylpropyl acrylate, 4-methylbenzyl acrylate, phenyl acrylate, 2-(phenylthio)ethyl methacrylate, 4-phenylbutyl acrylate, 5-phenylpentyl acrylate, 3-benzyloxypropyl acrylate, 2-(phenylthio)propyl acrylate, 2-(phenylthio)ethyl acrylate, 4-phenylbutyl acrylate, 4-methylbenzyl methacrylate, 2-(2-methylphenyl)ethyl acrylate, 2-(2-methylphenyl)-ethyl methacrylate, 2-(3-methylphenyl)ethyl acrylate, 2-(3-methylphenyl)-ethyl methacrylate, 2-(4-methylphenyl)ethyl acrylate, 2-(4-methylphenyl)-ethyl methacrylate, 2-(4-propylphenyl)ethyl acrylate, 2-(4-propylphenyl)ethyl methacrylate, 2-(4-(1-methylethyl)phenyl)ethyl acrylate, 2-(4-(1-methyl-ethyl)phenyl)ethyl methacrylate, 2-(4-methoxyphenyl)ethyl methacrylate, 2-(4-methoxyphenyl)ethyl acrylate, 2-(4-cyclohexylphenyl)ethyl acrylate, 2-(4-cyclohexylphenyl)ethyl methacrylate, 2-(4-chlorophenyl)ethyl methacrylate, 2-(4-chlorophenyl)ethyl acrylate, 2-(3-chlorophenyl)ethyl methacrylate, 2-(3-chlorophenyl) ethyl acrylate, 2-(2-chlorophenyl)ethyl methacrylate, 2-(2-chlorophenyl)ethyl acrylate, 2-(4-bromophenyl)ethyl acrylate, 2-(4-phenyl-phenyl)ethyl methacrylate, 2-(4-phenylphenyl)ethyl acrylate, 2-(3-phenyl-phenyl)ethyl methacrylate, 2-(3-phenylphenyl)ethyl acrylate, 2-(4-benzyl-phenyl)ethyl methacrylate, 2-(4-benzylphenyl)ethyl acrylate, 2-(phenyl-thio)ethyl acrylate, 3-benzyloxypropyl acrylate, 2-[2-(benzyloxy)ethoxy]ethyl acrylate, 2-[2-(benzyloxy)ethoxy]ethyl methacrylate, pentafluorophenyl methacrylate, heptadecafluorodecyl methacrylate, dodecafluoroheptyl methacrylate, heptadecafluorodecyl acrylate, trifluoroethyl methacrylate, octafluoropentyl methacrylate, hexafluorobutyl methacrylate, octafluoropentyl acrylate, trifluoroethyl acrylate, heptafluorobutyl acrylate, tetrafluoropropyl methacrylate, hexafluorobutyl acrylate, pentafluorophenyl acrylates, hexafluoroisopropyl methacrylate or a combination of these compounds.

The compositions according to the invention, as described above, also comprise at least one crosslinker and at least one UV absorber. It is also possible here for one substance to take on both properties, i.e. to be crosslinker and UV absorber the same time.

A crosslinker is a monomer containing at least two polymerisable groups. The crosslinker preferably has two polymerisable groups. The crosslinker may optionally also contain functional groups which are capable of coordinating water, such as, for example, OH or NH$_2$ groups. Crosslinkers functionalised in this way are likewise suitable hydrophilic monomers in the sense of the invention and are preferably employed in combination with the hydrophilic monomers described above.

Examples of crosslinkers are:
para-divinylbenzene, allyl acrylate, ethylene glycol divinyl ether, divinyl sulfone, allyl methacrylate, N,N'-methylene-bis-acrylamide, ethylene glycol diacrylate, N,N'-methylene-bis-methacrylamide, 1,3-propanediol diacrylate, 2,3-propanediol diacrylate, 1,4-butanediol diacrylate, 1,3-butanediol diacrylate, 1,5-pentanediol diacrylate, 1,6-hexanediol diacrylate, 1,7-heptanediol diacrylate, 1,8-octanediol diacrylate, 1,9-nonanediol diacrylate, 1,10-decanediol diacrylate, 1,11-undecanediol diacrylate, 1,12-dodecanediol diacrylate, 1,13-tridecanediol diacrylate, 1,14-tetradecanediol diacrylate, 1,15-pentadecanediol diacrylate, 1,16-hexadecanediol diacrylate, 1,17-heptadecanediol diacrylate, 1,18-octadecanediol diacrylate, 1,19-nonadecanediol diacrylate, 1,20-eicosanediol diacrylate, 1,21-heneicosanediol diacrylate, 1,22-docosanediol diacrylate, 1,23-tricosanediol diacrylate, 1,24-tetracosanediol diacrylate, ethylene glycol dimethacrylate, N,N'-dihydroxyethylenebisacrylamide, thiodiethylene glycol diacrylate, 1,3-propanediol dimethacrylate, 2,3-propanediol dimethacrylate, 1,3-butanediol dimethacrylate, 1,4-butanediol dimethacrylate, 1,5-pentanediol dimethacrylate, 1,6-hexanediol dimethacrylate, 1,7-heptanediol dimethacrylate, 1,8-octanediol dimethacrylate, 1,9-nonanediol dimethacrylate, 1,10-decanediol dimethacrylate, 1,11-undecanediol dimethacrylate, 1,12-dodecanediol dimethacrylate, 1,13-tridecanediol dimethacrylate, 1,14-tetradecanediol dimethacrylate, 1,15-pentadecanediol dimethacrylate, 1,16-hexadecanediol dimethacrylate, 1,17-heptadecanediol dimethacrylate, 1,18-octadecanediol dimethacrylate, 1,19-nonadecanediol dimethacrylate, 1,20-eicosanediol dimethacrylate, 1,21-heneicosanediol dimethacrylate, 1,22-docosanediol dimethacrylate, 1,23-tricosanediol dimethacrylate, 1,24-tetracosanediol dimethacrylate, 2-(acryloyloxy)ethyl methacrylate, 2-(acryloyloxy)propyl methacrylate, 3-(acryloyloxy)propyl methacrylate, 4-(acryloyloxy)butyl methacrylate, 5-(acryloyloxy)pentyl methacrylate, 6-(acryloyloxy)hexyl methacrylate, 7-(acryloyloxy)heptyl methacrylate, 8-(acryloyloxy)octyl methacrylate, 9-(acryloyloxy) nonyl methacrylate, 10-(acryloyloxy)decyl methacrylate, 11-(acryloyloxy)undecyl methacrylate, 12-(acryloyloxy)dodecyl methacrylate, 13-(acryloyloxy)tridecyl methacrylate, 14-(acryloyloxy)tetradecyl methacrylate, 15-(acryloyloxy)pentadecyl methacrylate, 16-(acryloyloxy)hexadecyl methacrylate, 17-(acryloyloxy)heptadecyl methacrylate, 18-(acryloyloxy)-octadecyl methacrylate, 19-(acryloyloxy)nonadecyl methacrylate, 20-(acryl-oyloxy)eicosanyl methacrylate, 21-(acryloyloxy)heneicosanyl methacrylate, 22-(acryloyloxy)docosanyl methacrylate, 23-(acryloyloxy)tricosanyl methacrylate, 24-(acryloyloxy)tetracosanyl methacrylate, neopentyl glycol diacrylate, di(ethylene glycol) diacrylate, N,N'-hexamethylenebisacrylamide, thiodiethylene glycol diacrylate, thiodiethylene glycol dimethacrylate, neopentyl glycol dimethacrylate, diethylene glycol dimethacrylate, diallyl phthalate, triallyl cyanurate, glyceryl 1,3-dimethacrylate, N,N'-hexamethylenebismethacrylamide, tri (ethylene glycol) diacrylate, tri(ethylene glycol) dimethacrylate, tetra(ethylene glycol) diacrylate, tetra(ethylene glycol) dimethacrylate, penta(ethylene glycol) diacrylate, penta(ethylene glycol) dimethacrylate, hexa(ethylene glycol) diacrylate, hexa(ethylene glycol) dimethacrylate, poly(ethylene glycol) dimethacrylate, poly(ethylene glycol) diacrylate.

Preferred crosslinkers are ethylene glycol dimethacrylate, 1,3-propanediol diacrylate, 2,3-propanediol diacrylate, 1,4-butanediol diacrylate, 1,3-butanediol diacrylate, 1,5-pentanediol diacrylate, 1,6-hexanediol diacrylate, 1,7-heptanediol diacrylate, 1,8-octanediol diacrylate, 1,9-nonanediol diacrylate, 1,10-decanediol diacrylate, 1,11-undecanediol diacrylate, 1,12-dodecanediol diacrylate, 1,13-tridecanediol diacrylate, 1,14-tetradecanediol diacrylate, 1,15-pentadecanediol diacrylate, 1,16-hexadecanediol diacrylate, 1,17-heptadecanediol diacrylate, 1,18-octadecanediol diacrylate, 1,19-nonadecanediol diacrylate, 1,20-eicosanediol diacrylate, 1,21-heneicosanediol diacrylate, 1,22-docosanediol diacrylate, 1,23-tricosanediol diacrylate, 1,24-tetracosanediol diacrylate, 1,3-propanediol dimethacrylate, 2,3-propanediol dimethacrylate, 1,3-butanediol dimethacrylate, 1,4-butanediol dimethacrylate, 1,5-pentanediol dimethacrylate, 1,6-hexanediol dimethacrylate, 1,7-heptanediol dimethacrylate, 1,8-octanediol dimethacrylate, 1,9-nonanediol dimethacrylate, 1,10-decanediol dimethacrylate, 1,11-undecanediol dimethacrylate, 1,12-dodecanediol dimethacrylate, 1,13-tridecanediol dimethacrylate, 1,14-tetradecanediol dimethacrylate, 1,15-pentadecanediol dimethacrylate, 1,16-hexadecanediol dimethacrylate, 1,17-heptadecanediol dimethacrylate, 1,18-octadecanediol dimethacrylate, 1,19-nonadecanediol dimethacrylate, 1,20-eicosanediol dimethacrylate, 1,21-heneicosanediol dimethacrylate, 1,22-docosanediol dimethacrylate, 1,23-tricosanediol dimethacrylate, 1,24-tetracosanediol dimethacrylate, glyceryl 1,3-dimethacrylate and diallyl phthalate.

Glyceryl 1,3-dimethacrylate (GDMA), ethylene glycol dimethacrylate (EGDMA), penta(ethylene glycol) dimethacrylate, hexa(ethylene glycol) dimethacrylate or a combination of these compounds is very particularly preferably selected in accordance with the invention.

Particularly preferred crosslinkers are ethylene glycol dimethacrylate, 1,3-propanediol diacrylate, 1,4-butanediol dimethacrylate, 1,6-hexanediol dimethacrylate, 1,18-octadecanediol diacrylate, 1,18-octadecanediol dimethacrylate, glyceryl 1,3-dimethacrylate and diallyl phthalate. Glyceryl 1,3-dimethacrylate (GDMA), ethylene glycol dimethacrylate (EGDMA), penta(ethylene glycol) dimethacrylate, hexa(ethylene glycol) dimethacrylate, 1,18-octadecanediol diacrylate, 1,18-octadecanediol dimethacrylate, 18-(acryloyloxy)octadecyl methacrylate, 1-acryloyl-18-octadecanediol dimethacrylate or a combination of these compounds is very particularly preferably selected in accordance with the invention.

The invention accordingly furthermore relates to a composition, as described above or preferably described below, in which the crosslinker is selected from the group para-divinylbenzene, allyl acrylate, ethylene glycol divinyl ether, divinyl sulfone, allyl methacrylate, N,N'-methylene-bisacrylamide, ethylene glycol diacrylate, N,N'-methylene-bis-methacrylamide, 1,3-propanediol diacrylate, 2,3-propanediol diacrylate, 1,4-butanediol diacrylate, 1,3-butanediol diacrylate, 1,5-pentanediol diacrylate, 1,6-hexanediol diacrylate, 1,7-heptanediol diacrylate, 1,8-octanediol diacrylate, 1,9-nonanediol diacrylate, 1,10-decanediol diacrylate, 1,11-undecanediol diacrylate, 1,12-dodecanediol diacrylate, 1,13-tridecanediol diacrylate, 1,14-tetradecanediol diacrylate, 1,15-pentadecanediol diacrylate, 1,16-hexadecanediol diacrylate, 1,17-heptadecanediol diacrylate, 1,18-octadecanediol diacrylate, 1,19-nonadecanediol diacrylate, 1,20-eicosanediol diacrylate, 1,21-heneicosanediol diacrylate, 1,22-docosanediol diacrylate, 1,23-tricosanediol diacrylate, 1,24-tetracosanediol diacrylate, ethylene glycol dimethacrylate, N,N'-dihydroxyethylenebisacrylamide, thiodiethylene glycol diacrylate, 1,3-propanediol dimethacrylate, 2,3-propanediol dimethacrylate, 1,3-butanediol dimethacrylate, 1,4-butanediol dimethacrylate, 1,5-pentanediol dimethacrylate, 1,6-hexanediol dimethacrylate, 1,7-heptanediol dimethacrylate, 1,8-octanediol dimethacrylate, 1,9-nonanediol dimethacrylate, 1,10-decanediol dimethacrylate, 1,11-undecanediol dimethacrylate, 1,12-dodecanediol dimethacrylate, 1,13-tridecanediol dimethacrylate, 1,14-tetradecanediol dimethacrylate, 1,15-pentadecanediol dimethacrylate, 1,16-hexadecanediol dimethacrylate, 1,17-heptadecanediol dimethacrylate, 1,18-octadecanediol dimethacrylate, 1,19-nonadecanediol dimethacrylate, 1,20-eicosanediol dimethacrylate, 1,21-heneicosanediol dimethacrylate, 1,22-docosanediol dimethacrylate, 1,23-tricosanediol dimethacrylate, 1,24-tetracosanediol dimethacrylate, 2-(acryloyloxy)ethyl methacrylate, 2-(acryl-oyloxy)propyl methacrylate, 3-(acryloyloxy)propyl methacrylate, 4-(acryloyloxy)butyl methacrylate, 5-(acryloyloxy)pentyl methacrylate, 6-(acryl-oyloxy)hexyl methacrylate, 7-(acryloyloxy)heptyl methacrylate, 8-(acryl-oyloxy)octyl methacrylate, 9-(acryloyloxy)nonyl methacrylate, 10-(acryloyloxy)decyl methacrylate, 11-(acryloyloxy)undecyl methacrylate, 12-(acryl-oyloxy)dodecyl methacrylate, 13-(acryloyloxy)tridecyl methacrylate, 14-(acryloyloxy)tetradecyl methacrylate, 15-(acryloyloxy)pentadecyl methacrylate, 16-(acryloyloxy)hexadecyl methacrylate, 17-(acryloyloxy)heptadecyl methacrylate, 18-(acryloyloxy)octadecyl methacrylate, 19-(acryloyloxy)-nonadecyl methacrylate, 20-(acryloyloxy)eicosanyl methacrylate, 21-(acryl-oyloxy) heneicosanyl methacrylate, 22-(acryloyloxy)docosanyl methacrylate, 23-(acryloyloxy)tricosanyl methacrylate, 24-(acryloyloxy)tetracosanyl methacrylate, neopentyl glycol diacrylate, di(ethylene glycol) diacrylate, N,N'-hexamethylenebisacrylamide, thiodiethylene glycol diacrylate, thiodiethylene glycol dimethacrylate, neopentyl glycol dimethacrylate, diethylene glycol dimethacrylate, diallyl phthalate, triallyl cyanurate, glyceryl 1,3-dimethacrylate, N,N'-hexamethylenebismethacrylamide, tri(ethylene glycol) diacrylate, tri(ethylene glycol) dimethacrylate, tetra(ethylene glycol) diacrylate, tetra(ethylene glycol) dimethacrylate, penta(ethylene glycol) diacrylate, penta(ethylene glycol) dimethacrylate, hexa(ethylene glycol) diacrylate, hexa(ethylene glycol) dimethacrylate, poly(ethylene glycol) dimethacrylate, poly(ethylene glycol) diacrylate or a combination of these compounds.

The UV absorber to be selected in accordance with the invention is a molecule containing a polymerisable group and having strong absorption in the UV range.

Examples of UV absorbers are:

3-(3-(tert-butyl)-4-hydroxy-5-(5-methoxy-2H-benzo[d]-1,2,3-triazol-2-yl)-phenoxy)propyl methacrylate, 2-(2-hydroxy-5-vinylphenyl)-2H-benzotriazole, allyl-2-hydroxybenzophenone, 2-allyl-6-(2H-benzotriazol-2-yl)-p-cresol, 4-methacryloxy-2-hydroxybenzophenone, 2-(2'-hydroxy-3'-methallyl-5'-methylphenyl)benzotriazole, 2-hydroxy-4-methacryloyloxybenzophenone, 4-acryloylethoxy-2-hydroxybenzophenone, 2-[3-(2H-benzotriazol-2-yl)-4-hydroxyphenyl]ethyl methacrylate, 2-(2'-hydroxy-5'-methacrylamidophenyl)-5-methoxybenzotriazole, 2-(2'-hydroxy-5'-methacrylamidophenyl)-5-chlorobenzotriazole, 2-(2'-hydroxy-5'-methacryloxypropylphenyl)benzotriazole, 2-(2'-hydroxy-5'-methacryloylpropyl-3'-tert-butyl-phenyl)-5-methoxy-2H-benzotriazol, 2-(3-(tert-butyl)-4-hydroxy-5-(5-methoxy-2H-benzo[d]-1,2,3-triazol-2-yl)phenoxy)ethyl methacrylate, 2-[3'-tert-butyl-2'-hydroxy-5'-(3"-methacryloyloxypropyl)phenyl]-5-chlorobenzotriazole, 2-{2'-hydroxy-3'-tert-butyl-5'-[3'-methacryloyloxypropoxy]phenyl}-5-methoxy-2H-benzotriazole, 2-[3'tert-butyl-5'-(3''-dimethylvinylsilylpropoxy)-2'-hydroxyphenyl]-5-methoxybenzotriazole, 2-(tert-butyl)-6-(5-chloro-2H-benzo[d]-1,2,3-triazol-2-yl)-4-vinylphenol, 2-(2H-1,2,3-benzotriazol-2-yl)-4-methyl-6-(2-methylprop-2-enyl) phenol, 2-(3-acetyl-2-aminophenoxy)ethyl methacrylate, 2-(4-benzoyl-3-hydroxyphenoxy)ethyl acrylate.

Preferred UV absorbers are methacrylates and acrylates of phenyltriazoles or benzotriazoles, preferably of benzotriazoles.

A particularly preferred UV absorber is 2-[3-(2H-benzotriazol-2-yl)-4-hydroxyphenyl]ethyl methacrylate or 3-(3-(tert-butyl)-4-hydroxy-5-(5-methoxy-2H-benzo[d]-1,2,3-triazol-2-yl)phenoxy)propyl methacrylate.

The invention accordingly furthermore relates to a composition, as described above or preferably described below, in which the UV absorber is selected from the group 3-(3-(tert-butyl)-4-hydroxy-5-(5-methoxy-2H-benzo-[d]-1,2,3-triazol-2-yl)phenoxy)propyl methacrylate, 2-(2-hydroxy-5-vinyl-phenyl)-2H-benzotriazole, allyl-2-hydroxybenzophenone, 2-allyl-6-(2H-benzotriazol-2-yl)-p-cresol, 4-methacryloxy-2-hydroxybenzophenone, 2-(2'-hydroxy-3'-methallyl-5'-methylphenyl)benzotriazole, 2-hydroxy-4-methacryloyloxybenzophenone, 4-acryloylethoxy-2-hydroxybenzophenone, 2-[3-(2H-benzotriazol-2-yl)-4-hydroxyphenyl]ethyl methacrylate, 2-(2'-hydroxy-5'-methacrylamidophenyl)-5-methoxybenzotriazole, 2-(2'-hydroxy-5'-meth-acrylamidophenyl)-5-chlorobenzotriazole, 2-(2'-hydroxy-5'-methacryloxy-propylphenyl)benzotriazole, 2-(2'-hydroxy-5'-methacryloylpropyl-3'-tert-butyl-phenyl)-5-methoxy-2H-benzotriazole, 2-(3-(tert-butyl)-4-hydroxy-5-(5-methoxy-2H-benzo[d]-1,2,3-triazol-2-yl)phenoxy) ethyl methacrylate, 2-[3'-tert-butyl-2'-hydroxy-5'-(3''-methacryloyloxypropyl)phenyl]-5-chlorobenzotriazole, 2-{2'-hydroxy-3'-tert-butyl-5'-[3'-methacryloyloxypropoxy]phenyl}-5-methoxy-2H-benzotriazole, 2-[3'tert-butyl-5'-(3''-dimethylvinylsilylpropoxy)-2'-hydroxyphenyl]-5-methoxybenzotriazole, 2-(tert-butyl)-6-(5-chloro-2H-benzo[d]-1,2,3-triazol-2-yl)-4-vinylphenol, 2-(2H-1,2,3-benzotriazol-2-yl)-4-methyl-6-(2-methylprop-2-enyl) phenol, 2-(3-acetyl-2-aminophenoxy)ethyl methacrylate, 2-(4-benzoyl-3-hydroxyphenoxy)ethyl acrylate or a combination of these compounds.

The invention furthermore relates to a composition, as described above or preferably described, characterised in that it comprises 1 molar equivalent of a compound of the formula (1) or a preferred compound of the formula (1), as described above, or 1 molar equivalent of the sum of all compounds of the formula (1), as described above or preferably described;

0.51 to 1.24 molar equivalents of the hydrophilic monomers, as described above or preferably described;

0 to 1.0 molar equivalents of the non-hydrophilic monomers which do not conform to the formula (1), as described above or preferably described;

0.04 to 0.5 molar equivalents of the crosslinker(s), as described above or preferably described and 0.005 to 0.05 molar equivalents of the UV absorber(s), as described above or preferably described.

The invention furthermore relates to a composition, as described above or preferably described, characterised in that it comprises 1 molar equivalent of a compound of the formula (1) or a preferred compound of the formula (1), as described above, or 1 molar equivalent of the sum of all compounds of the formula (1), as described above or preferably described;

0.51 to 1.24 molar equivalents of the hydrophilic monomers, as described above or preferably described;

0 to 0.2 molar equivalents of the non-hydrophilic monomers which do not conform to the formula (1), as described above or preferably described;

0.05 to 0.5 molar equivalents of the crosslinker(s), as described above or preferably described and 0.005 to 0.05 molar equivalents of the UV absorber(s), as described above or preferably described.

The invention furthermore relates to a composition, as described above or preferably described, characterised in that it comprises 1 molar equivalent of a compound of the formula (1) or a preferred compound of the formula (1), as described above, or 1 molar equivalent of the sum of all compounds of the formula (1), as described above or preferably described;

0.51 to 1.24 molar equivalents of the hydrophilic monomers, as described above or preferably described;

0.05 to 1.0 molar equivalents of the non-hydrophilic monomers which do not conform to the formula (1), as described above or preferably described;

0.04 to 0.5 molar equivalents of the crosslinker(s), as described above or preferably described and 0.005 to 0.05 molar equivalents of the UV absorber(s), as described above or preferably described.

The invention furthermore relates to a composition, as described above or preferably described, characterised in that it comprises 1 molar equivalent of a compound of the formula (1) or a preferred compound of the formula (1), as described above, or 1 molar equivalent of the sum of all compounds of the formula (1), as described above or preferably described;

0.51 to 1.24 molar equivalents of the hydrophilic monomers, as described above or preferably described;

0.05 to 0.2 molar equivalents of the non-hydrophilic monomers which do not conform to the formula (1), as described above or preferably described;

0.05 to 0.5 molar equivalents of the crosslinker(s), as described above or preferably described and 0.005 to 0.05 molar equivalents of the UV absorber(s), as described above or preferably described.

In an embodiment of the composition according to the invention, it is preferred if, besides the one molar equivalent of a compound of the formula (1), (2), (3), (4) or a preferred compound, as described above, for example (M-1) to (M-63), or the sum of all compounds of this type, it comprises 0.56 to 1.2 molar equivalents or preferably 0.6 to one molar equivalent of all hydrophilic monomers, as described above or as preferably described.

In an embodiment of the composition according to the invention, it is preferred if, besides the one molar equivalent of a compound of the formula (1), (2), (3), (4) or a preferred compound, as described above, for example (M-1) to (M-63), or the sum of all compounds of this type, it comprises 0.1 to 0.2 molar equivalents of the sum of the non-hydrophilic monomers, as described above or preferably described.

In an embodiment of the composition according to the invention, it is preferred if, besides the one molar equivalent of a compound of the formula (1), (2), (3), (4) or a preferred compound, as described above, for example (M-1) to (M-63), or the sum of all compounds of this type, it comprises 0.01 to 0.03 molar equivalents of the sum of the crosslinkers, as described above or preferably described.

In an embodiment of the composition according to the invention, it is preferred if, besides the one molar equivalent of a compound of the formula (1), (2), (3), (4) or a preferred compound, as described above, for example (M-1) to (M-63), or the sum of all compounds of this type, it comprises 0.05 to 0.3 molar equivalents of the sum of the crosslinkers, as described above or preferably described.

In an embodiment of the composition according to the invention, it is preferred if, besides the one molar equivalent of a compound of the formula (1), (2), (3), (4) or a preferred compound, as described above, for example (M-1) to (M-63), or the sum of all compounds of this type, it comprises 0.007 to 0.02 molar equivalents of the sum of the UV absorbers, as described above or preferably described.

In an embodiment of the composition according to the invention, it is preferred if, besides the one molar equivalent of a compound of the formula (1), (2), (3), (4) or a preferred compound, as described above, for example (M-1) to (M-63), or the sum of all compounds of this type and the above-mentioned molar equivalents of the sum of the hydrophilic monomers, non-hydrophilic monomers, crosslinkers and UV absorbers, it comprises 0 to 0.004 molar equivalents of the sum of the blue absorbers, as described above or preferably described, or preferably 1 micromolar equivalent to 0.004 molar equivalents of the sum of the blue absorbers, as described above or preferably described, or particularly preferably 8 micromolar equivalents to 0.002 molar equivalents of the sum blue absorbers, as described above or preferably described.

The suitable choice of the amount of the blue absorber is dependent on the band position and the corresponding extinction coefficient, so that the person skilled in the art is capable of adapting the above-mentioned molar equivalents of the blue absorber correspondingly. The choice of the amount of the blue absorber should be selected so that this influences the UV/VIS spectrum of the copolymer according to the invention in such a way that the transmission in the blue wavelength range is minimal.

In the composition according to the invention, as described above or as preferably described, a free-radical initiator is also added in order that polymerisation of the monomer composition according to the invention, as described above, can take place.

The term initiator, free-radical starter or free-radical initiator is used synonymously.

The polarisation is preferably initiated by means of free radicals, both thermal initiators, such as acetyl peroxide, stearoyl peroxide, 2,2'-Azo-bis-(iso-butyronitrile), tert-butyl peroxypivalate, 2,2'-azo-bis-(2-cyanobutane nitrile), benzoyl peroxide, Luperox® TBEC, 2,2'-(diazene-1,2-diyl)bis(2,4-dimethyl-pentane nitrile), decanoyl peroxide, di(tert-butylcyclohexyl) peroxydicarbonate, lauroyl peroxide, tert-butyl peroxydiethylacetate, tert-butyl peroxy-2-ethylhexanoate, tert-amyl peroxy-2-ethylhexanoate, VA-086, 1,1'-azo-di(hexahydrobenzonitrile), 1,1-bis(tert-butylperoxy)-3,3,5-trimethylcyclohexane, peroxy dicarbonate, and also photochemical initiators, such as Darocur 2273, Darocur 3331, Darocur 1164, Irgacur 1850, Darocur 1700, Darocur 1173, Irgacur 184, Darocur 1116, Darocur 2959, benzoin methyl ether, benzoin ethyl ether, Irgacur 651, 2,4,6-(trimethylbenzoyl)diphenyl-phosphine oxide, bis(2,4,6-trimethylbenzoyl)phenylphosphine oxide, bis(2,6-dichlorobenzoyl)-4-propylphenylphosphine oxide, are suitable for this purpose.

A thermal initiator is preferably used. A thermal initiator as described above is preferably used. 1,1-Bis(tert-butylperoxy)-3,3,5-trimethylcyclohexane, tert-butyl peroxy-2-ethylhexanoate and tert-amyl peroxy-2-ethylhexanoate are particularly preferably employed as free-radical initiator, preferably in 0.0025 to 0.05 molar equivalents, based on the sum of all compounds of the formula (1), as described above or as preferably described, present in the composition.

The invention therefore furthermore relates to a composition, as described above, where the composition comprises a free-radical initiator.

The invention furthermore relates to a composition, as described above or preferably described, characterised in that it comprises 1 molar equivalent of a compound of the formula (1) or a preferred compound of the formula (1), as described above, or 1 molar equivalent of the sum of all compounds of the formula (1), as described above or preferably described;

0.51 to 1.24 molar equivalents of the hydrophilic monomers, as described above or preferably described;

0 to 0.2 molar equivalents of the non-hydrophilic monomers which do not conform to the formula (1), as described above or preferably described;

0.05 to 0.5 molar equivalents of the crosslinker(s), as described above or preferably described;

0.005 to 0.05 molar equivalents of the UV absorber(s), as described above or preferably described;

0 to 0.004 molar equivalents of the blue absorber(s), as described above or preferably described;

0.0025 to 0.05 molar equivalents of a free-radical initiator, as described above or preferably described.

The invention furthermore relates to a composition, as described above or preferably described, characterised in that it comprises 1 molar equivalent of a compound of the formula (1) or a preferred compound of the formula (1), as described above, or 1 molar equivalent of the sum of all compounds of the formula (1), as described above or preferably described;

0.51 to 1.24 molar equivalents of the hydrophilic monomers, as described above or preferably described;

0 to 1.0 molar equivalents of the non-hydrophilic monomers which do not conform to the formula (1), as described above or preferably described;

0.04 to 0.5 molar equivalents of the crosslinker(s), as described above or preferably described;

0.005 to 0.05 molar equivalents of the UV absorber(s), as described above or preferably described;

0 to 0.004 molar equivalents of the blue absorber(s), as described above or preferably described;

0.0025 to 0.05 molar equivalents of a free-radical initiator, as described above or preferably described.

The invention furthermore relates to a composition, as described above or preferably described, characterised in that it consists of one molar equivalent of a compound of the formula (1) or a preferred compound of the formula (1), as described above, or one molar equivalent of the sum of all compounds of the formula (1), as described above or preferably described;

0.51 to 1.24 molar equivalents of the hydrophilic monomers, as described above or preferably described;

0 to 0.2 molar equivalents of the non-hydrophilic monomers which do not conform to the formula (1), as described above or preferably described;

0.05 to 0.5 molar equivalents of the crosslinker(s), as described above or preferably described;

0.005 to 0.05 molar equivalents of the UV absorber(s), as described above or preferably described;

0 to 0.004 molar equivalents of the blue absorber(s), as described above or preferably described;

0.005 to 0.05 molar equivalents of a free-radical initiator, as described above or preferably described.

In this embodiment, the molar equivalents of the constituents indicated as preferred apply correspondingly, as described above.

The invention furthermore relates to a composition, as described above or preferably described, characterised in that it consists of one molar equivalent of a compound of the formula (1) or a preferred compound of the formula (1), as described above, or one molar equivalent of the sum of all compounds of the formula (1), as described above or preferably described;

0.51 to 1.24 molar equivalents of the hydrophilic monomers, as described above or preferably described;

0 to 1.0 molar equivalents of the non-hydrophilic monomers, preferably 0 to 0.2 molar equivalents of the non-hydrophilic monomers which do not conform to the formula (1), as described above or preferably described;

0.04 to 0.5 molar equivalents of the crosslinker(s), as described above or preferably described;

0.005 to 0.05 molar equivalents of the UV absorber(s), as described above or preferably described;

0 to 0.004 molar equivalents of the blue absorber(s), as described above or preferably described;

0.0025 to 0.05 molar equivalents of a free-radical initiator, as described above or preferably described.

For the composition, the embodiments and the preferred embodiments of the constituents of the composition can be combined as desired. It is preferred if in each case the preferred embodiments of the respective constituents and their amounts are combined.

If the composition according to the invention, as described above or as preferably described, is polymerised, crosslinked copolymers form which are soft from an ambient temperature between 16° C. and 20° C. and have all advantages as described above. They exhibit, in particular, no or virtually no glistening. The term "no or virtually no glistening" has the meaning as described above. The copolymers have glass transition temperatures (Tg) of 15° C. or less and have a refractive index of at least 1.5, preferably at least 1.52, where the inducible change in the refractive power is preferably still at least 0.005 ($\Delta n_D$=0.005).

The invention accordingly furthermore relates to a crosslinked copolymer comprising a polymerised composition as described above or as preferably described.

The invention accordingly furthermore relates to a crosslinked copolymer consisting of a polymerised composition as described above or as preferably described.

The reaction conditions of a free-radical polymerisation are adequately known to the person skilled in the art in the area of polymer chemistry. Owing to the special feature that the compounds of the formula (1) or preferred embodiments thereof, as described above, are generally hydrophobic, the miscibility of the components, in particular due to the presence of the hydrophilic monomers, in the composition according to invention may be limited. However, the person skilled in the art is capable of selecting the initiator carefully and selecting the process in the case of a thermal process with respect to the temperature so that a homogeneous copolymer forms. In the case of an identified miscibility gap, the polymerisation temperature should be selected so that it does not lie within the miscibility gap.

The person skilled in the art is capable of identifying an incompatibility of the materials which could lead to a miscibility gap. He can, for example, irradiate a composition according to the invention, as described above, by means of a suitable light source and record UV/VIS spectra at various temperatures. Suitable wavelengths are between 450 nm and 750 nm. If, for example, the transmission is plotted against the temperature for a wavelength of 450 nm, a miscibility gap is identified if the increase in the transmission jumps. The jump in the transmission can be explained by a sudden decrease in the density of the mixture when separation occurs. With the aid of an experiment of this type, the person skilled in the art is able to select the suitable temperature of the thermally induced free-radical polymerisation.

The invention therefore furthermore relates to a process for the preparation of the crosslinked copolymer, as described above, characterised in that the composition according to the invention, as described above comprising or consisting of the components described or described as preferred, is provided and subsequently subjected to free-radical polymerisation, where the polymerisation temperature to be selected in the case of the use of a thermal free-radical initiator does not lie within a miscibility gap of the materials of the composition provided.

The polymerisation, as described above, is preferably carried out without a solvent.

The properties of the copolymer according to the invention as raw material for the production of ophthalmological products can be determined by standard methods, such as, for example, using refractometry with and without irradiation. Glistening and water absorption is determined by incubating the sample at a certain temperature and for a certain time, generating a multifocus image and counting the vacuoles on this image. The vacuole number is quoted standardised to the volume. The water absorption can be determined, for example, from the mass difference before and after incubation in water. Techniques for the determination of the material property of polymers are known in the prior art and are not restricted in any way. The methods used for characterisation of the crosslinked copolymers according to the invention are described in greater detail in the experimental part, but should not be regarded as restrictive.

The invention furthermore likewise relates to the use of the composition, as described above or as preferably described, or the use of the crosslinked copolymer resulting from the polymerised composition, as described above or as preferably described, for the production of a blank for an ophthalmological product, preferably for an ophthalmic lens or an ophthalmological implant, particularly preferably for an intraocular lens.

The term blank can also be used synonymously with the term semifinished product and describes products which, in their basic form, have been produced from a raw material or from raw materials to such an extent that the requisite working steps for fabrication of the end product are considerably reduced. In general, blanks are prefabricated to a certain dimension, are geometrically specified, solid bodies and comply with certain standards and certification measures. The term semifinished product known from the metal industry, arising from "semifinished product manufacturing", covers not only products made from metals or metal alloys, but also made from plastic and correspondingly also applies to the manufacture of medical products, also including ophthalmological products.

The invention accordingly furthermore relates to an article comprising the copolymer according to the invention or the polymerised composition according to the invention, as described above or as preferably described. The article accordingly as the same advantages that have been described for the copolymer according to the invention. The statements above apply correspondingly.

The article is not restricted in any way and is preferably a blank or the finished ophthalmological product, preferably an ophthalmic lens or an ophthalmological implant, particularly preferably an intraocular lens or a phakic intraocular lens.

The invention accordingly furthermore relates to the article as described above, selected from a blank for an ophthalmic lens or an ophthalmological implant, an ophthalmological implant, or an ophthalmic lens.

The copolymer according to the invention or the polymerised composition according to the invention, as described above, can be used without restriction for ophthalmic lenses of any type, preferably intraocular lenses or phakic lenses, both for the haptic and also for the central optical lens. The material according to the invention can also be combined with further materials which are known for the production of ophthalmic lenses. This would be the case, for example, if the haptic is intended to consist of a different plastic to the central optical lens. The person skilled in the art in the area of the production of intraocular lenses is familiar with the requisite processing steps for the production of the blank and the finished product.

The free-radical polymerisation of the composition according to the invention, as described above or as preferably described, can be carried out, for example, in a polymerisation mould. Multifarious materials, moulds and techniques are known in this respect. A corresponding example is described in the experimental part.

The invention therefore furthermore relates to a process for the production of an article, as described above or as preferably described, characterised in that a composition according to the invention, as described above, is provided, a polymerisation is carried out and an article is shaped at the same time or subsequently. The article can, for example, be produced by moulding as a blank, which is further converted into the finished product, for example the ophthalmic lens, as described above. The further manufacturing steps by cutting methods are adequately known to the person skilled in the art.

Even without further comments, it is assumed that a person skilled in the art will be able to utilise the above description in the broadest scope. The preferred embodiments should therefore merely be regarded as descriptive disclosure which is absolutely not limiting in any way.

Above and below, all temperatures are quoted in ° C.

The invention is explained in greater detail by the following examples, but without being restricted thereto.

EXAMPLES

Example 1—Preparation of Compounds A, B, C and D

Compound A, corresponding to (M-23), 12-((2-oxo-3-(4-pentyl-2-(trifluoro-methyl)phenyl)-2H-chromen-7-yl)oxy)dodecyl acrylate

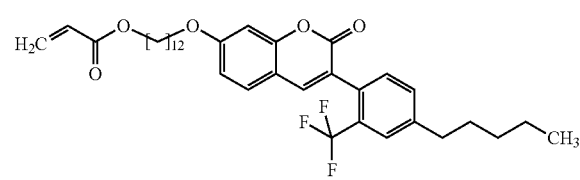

Compound B, corresponding to (M-20), 12-((2-oxo-3-(4-pentyl-2-(trifluoro-methoxy)phenyl)-2H-chromen-7-yl)oxy)dodecyl acrylate

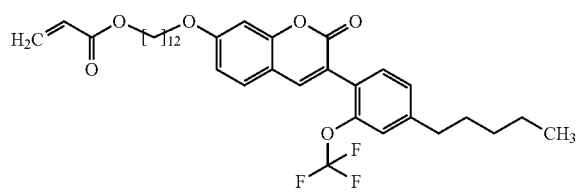

Compound C, corresponding to (M-42), 12-((2-oxo-3-(4-pentyl-2-(trifluoro-methoxy)phenyl)-2H-chromen-7-yl)oxy)dodecyl methacrylate

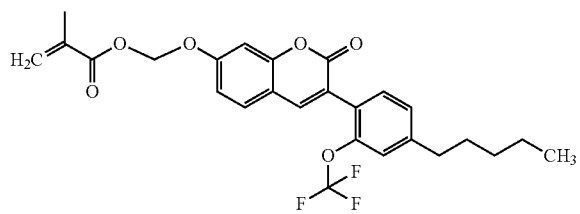 [SMILES: C=C(C)C(=O)OCOc1ccc2cc(-c3ccc(CCCCC)cc3OC(F)(F)F)c(=O)oc2c1]

Compound D, corresponding to (M-33), 11-(2-oxo-3-(4-pentyl-2-(trifluoro-methoxy)phenyl)-2H-chromen-7-yl)undecyl acrylate

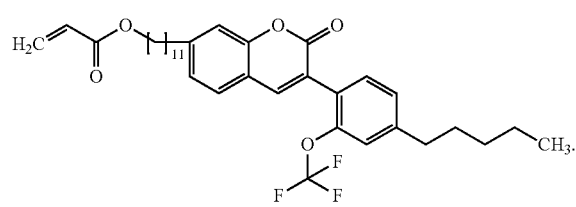

The preparation of the above-mentioned compounds A is depicted in Schema 1, the preparation of compounds B and C is depicted in Schema 2 and the preparation of compound D is depicted in Schema 3:

Scheme 1
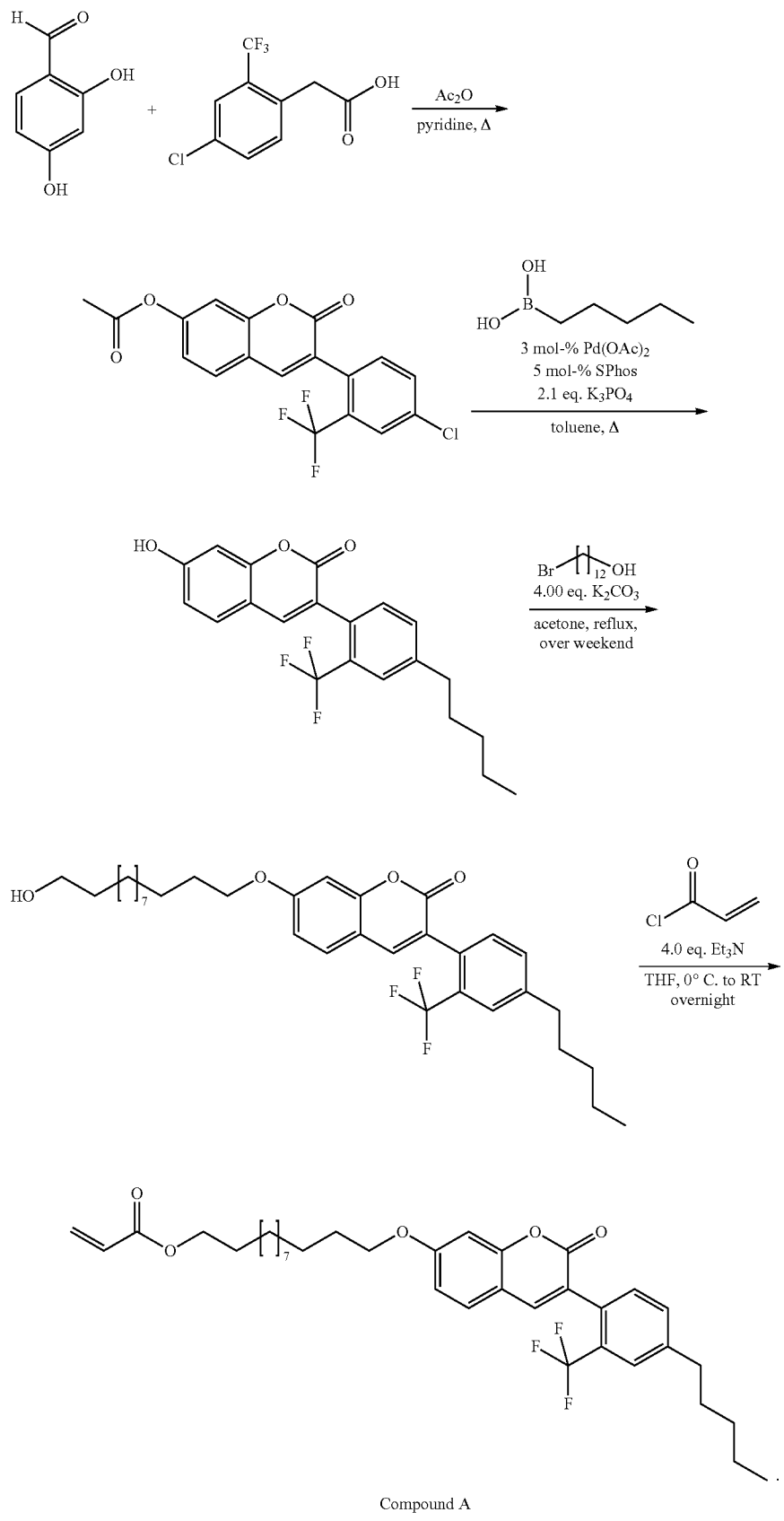
Compound A

Scheme 2
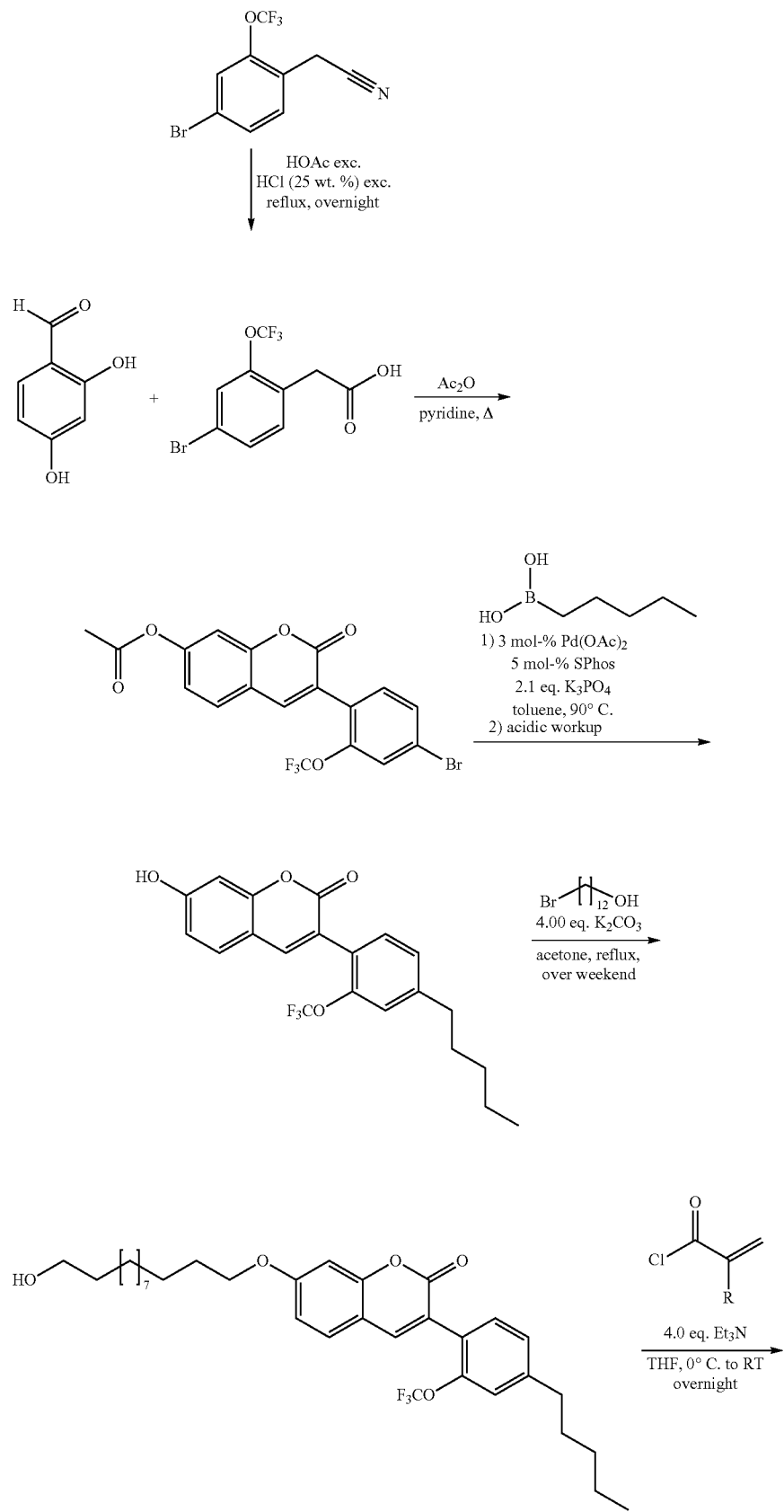

-continued
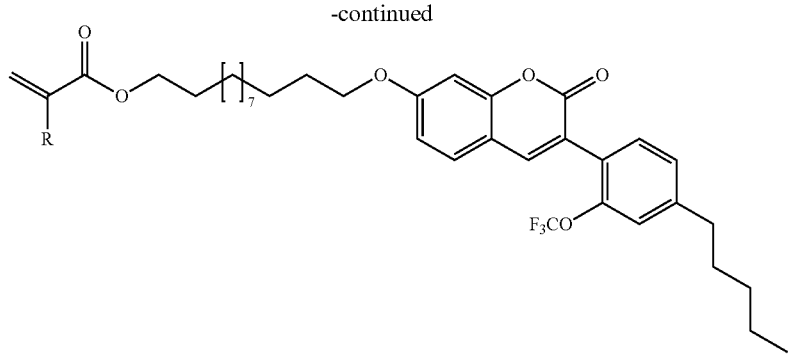
Compound B
or
Compound C
R = H, Me
Scheme 3
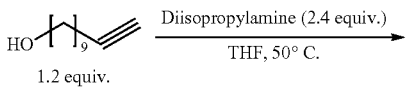
1.2 equiv.
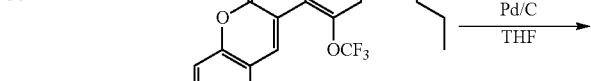
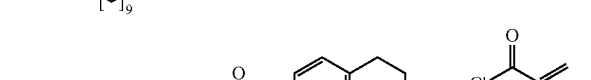
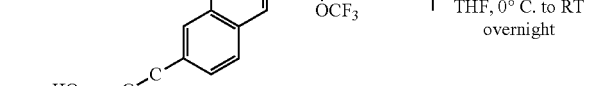
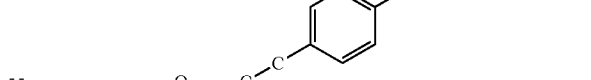
Compound D
Example 2: Polymerisation
The monomers employed, as evident in Table 1 below, were purchased commercially and employed without further purification.

General Procedure

A corresponding composition according to the invention, as described in Table 1, is prepared in a flask by mixing the individual components and degassed.

The polymerisation is carried out without a solvent. The polymerisation mould consists in the interior of a silicone mat of suitable thickness, for example a thickness between 1 to 3 mm, from which the shape of the specimen, for example a bar of 1 mm×25 mm × 30–70 mm, or of the correspondingly desired blank, and a filling channel have been cut out, and two glass plates, between which the silicone mat is laid. A separation layer, for example a PET film, is in each case laid between glass plate and silicone mat. The polymerisation conditions are selected depending on the initiator, which are apparent to skilled personnel from the respective mixture composition. The amount of initiator is likewise indicated in Table 1. The polymerisation temperature is between 70° C. and 180° C.

C18MA=octadecyl methacrylate
HEMA=2hydroxyethyl methacrylate
EGDMA=ethylene glycol dimethacrylate
UV abs=2-[3-(2H-benzotriazol-2-yl)-4-hydroxyphenyl] ethyl methacrylate
DtCyP=1,1-bis(tert-butylperoxy)-3,3,5-trimethylcyclohexane

TABLE 1

Compositions-figures in equivalents, the photoactive monomer corresponds to compound A:

|        | 1    | 2    | 3    | 4*   | 5*   | 6*   |
|--------|------|------|------|------|------|------|
| Comp. A | 1.00 | 1.00 | 1.00 | 1.00 | 1.00 | 1.00 |
| C18MA  | 0.15 | 0.15 | 0.15 | 0.15 | 0.15 | 0.15 |
| HEMA   | 0.00 | 0.25 | 0.50 | 0.60 | 0.70 | 0.80 |
| EGDMA  | 0.10 | 0.10 | 0.10 | 0.10 | 0.10 | 0.10 |
| UV abs | 0.01 | 0.01 | 0.01 | 0.01 | 0.01 | 0.01 |
| DtCyP  | 0.02 | 0.02 | 0.02 | 0.02 | 0.02 | 0.02 |

|        | 7*   | 8    | 9    | 10   |
|--------|------|------|------|------|
| Comp. A | 1.00 | 1.00 | 1.00 | 1.00 |
| C18MA  | 0.15 | 0.15 | 0.15 | 0.15 |
| HEMA   | 1.00 | 1.25 | 1.50 | 2.00 |
| EGDMA  | 0.10 | 0.10 | 0.10 | 0.10 |
| UV abs | 0.01 | 0.01 | 0.01 | 0.01 |
| DtCyP  | 0.02 | 0.02 | 0.02 | 0.02 |

The compositions according to the invention are denoted by an *.

The materials from the polymerisation of compositions 1 to 10 in Table 1 are characterised using the following methods:

Refractometry

The refractive index no is determined by means of a Schmidt-Haensch model ATR-Lambda multiwave refractometer. The measurements are carried out at 20° C.

Irradiation and Refractive Index Change

A sample is covered with a borosilicate glass and irradiated by means of a 125 W Hg high-pressure lamp. The refractive index is determined between the measurements. The irradiation is continued until a refractive index change is no longer observed. The difference between the initial refractive index and the refractive index after irradiation is referred to as $\Delta n_D$.

Glistening (GT) Water Absorption (WA)

A sample with a thickness of 1 mm, for example a disc having a diameter of 9.5 mm and a thickness of 1 mm, is incubated in water at 45° C. for 24 h. The sample is subsequently incubated in warm water at 37° C. for a further 2.5 h. The samples treated in this way are investigated by microscopy. A series of images with various focal planes is recorded in dark field using a micro-scope (M205 FA, Leica) fitted with a camera (DMC 4500, Leica). This is joined together to form a multifocus image, and the vacuoles on this image are counted. The vacuole number is quoted standardised to the volume.

The water absorption is determined from the mass difference before and after incubation for 72 hours in water at 45° C. or 30° C.

TABLE 2

Results: (n.d. = not determined)

|                                | 1     | 2     | 3     | 4*    | 5*    | 6*    |
|--------------------------------|-------|-------|-------|-------|-------|-------|
| Appearance after polymerisation | clear | clear | clear | clear | clear | clear |
| $n_D$                          | 1.544 | 1.542 | 1.541 | 1.539 | 1.537 | 1.532 |
| $\Delta n_D$                   | 0.006 | 0.006 | 0.005 | 0.007 | 0.006 | 0.006 |
| Appearance after GT test       | cloudy | cloudy | cloudy | clear | clear | clear |
| Vacuoles/mm$^3$                | n.d.  | n.d.  | n.d.  | 9.0   | 3.9   | 10.8  |
| Miyata scale                   | n.d.  | n.d.  | n.d.  | 0     | 0     | 0     |
| WA (45° C.)/%                  | 0     | 0     | 0.2   | 0.9   | 0.9   | 1.4   |
| WA (30° C.)/%                  | 0.1   | 0.2   | 0.2   | 0.6   | 0.8   | 1.0   |

|                                | 7*    | 8     | 9     | 10    |
|--------------------------------|-------|-------|-------|-------|
| Appearance after polymerisation | clear | clear | cloudy | cloudy |
| $n_D$                          | 1.529 | 1.542 | 1.530 | 1.525 |
| $\Delta n_D$                   | 0.006 | 0.003 | 0.005 | 0.004 |
| Appearance after GT test       | clear | cloudy | cloudy | cloudy |
| Vacuoles/mm$^3$                | 0.01  | 0.01  | 0.01  | 0.01  |

TABLE 2-continued

| Results: (n.d. = not determined) | | | | |
|---|---|---|---|---|
| Miyata scale | 8.5 | n.d. | n.d. | n.d. |
| WA (45° C.)/% | 0 | n.d. | n.d. | n.d. |
| WA (30° C.)/% | 1.6 | 3.6 | 3.0 | 4.2 |
| WA (30° C.)/% | 1.6 | 2.7 | 3.3 | 3.9 |

The results of polymerised compositions 1 to 10 (corresponding to copolymers 1 to 10) clearly show that, owing to the addition of the hydrophilic component HEMA, good refractive index changes are still achieved, but no opacification occurs in the glistening test when the amount of HEMA is selected in accordance with the invention. The copolymer of polymerised compositions 4, 5, 6, 7 is still clear after the polymerisation, furthermore it exhibits no opacification after glistening, i.e. virtually no glistening is evident and the vacuole number corresponds to degree 0 on the scale introduced by Miyata.

Polymerised compositions 4 to 7 according to the invention are ideal. If all material properties are considered together, polymerised composition 5 is particularly preferred.

Example 3

The following compositions are polymerised analogously to Example 2 and measured in accordance with Example 2:

TABLE 3

| | 11* | 12* | 13* | 14* | 15* | 16* |
|---|---|---|---|---|---|---|
| Compound | A | A | B | C | D | D |
| Amount of compound | 1.00 | 1.00 | 1.00 | 1.00 | 1.00 | 1.00 |

TABLE 3-continued

| | | | | | | |
|---|---|---|---|---|---|---|
| HEMA | — | — | 0.60 | 0.60 | 0.80 | 0.60 |
| HEA | 0.56 | 0.6 | — | — | — | — |
| EGPEA | 0.11 | — | — | — | — | — |
| GDMA | 0.1 | 0.1 | 0.1 | 0.1 | 0.1 | 0.1 |
| UV abs | 0.01 | 0.01 | 0.01 | 0.01 | 0.01 | 0.01 |
| DtCyP | 0.02 | 0.02 | 0.02 | 0.02 | 0.02 | 0.02 |

| | 17* | 18 |
|---|---|---|
| Compound | B | B |
| Amount of compound | 1.00 | 1.00 |
| HEMA | 1.00 | 1.25 |
| HEA | — | — |
| EGPEA | — | — |
| GDMA | 0.1 | 0.1 |
| UV abs | 0.01 | 0.01 |
| DtCyP | 0.02 | 0.02 |

The results are shown in Table 4:

TABLE 4

| | 11* | 12* | 13* | 14* | 15* | 16* |
|---|---|---|---|---|---|---|
| Appearance after polymerisation | clear | clear | clear | clear | clear | clear |
| $n_D$ | 1.548 | 1.547 | 1.544 | 1.542 | 1.538 | 1.537 |
| $\Delta n_D$ | 0.007 | 0.003 | 0.022 | 0.019 | 0.013 | 0.012 |
| Appearance after GT test | clear | clear | clear | clear | clear | clear |
| Vacuoles/mm³ | 15.3 | 10.8 | 2.2 | 17.4 | 13.6 | 7.1 |
| Miyata scale | 0 | 0 | 0 | 0 | 0 | 0 |
| WA (45° C.)/% | 0.9 | 1.3 | 1.6 | 1.3 | 2.3 | 2.1 |
| WA (30° C.)/% | 0.8 | 1.0 | 1.0 | 0.8 | 1.7 | 1.5 |

| | 17* | 18 |
|---|---|---|
| Appearance after polymerisation | clear | clear |
| $n_D$ | 1.549 | 1.543 |
| $\Delta n_D$ | 0.012 | 0.007 |
| Appearance after GT test | clear | cloudy |
| Vacuoles/mm³ | 1.4 | n.b. |
| Miyata scale | 0 | n.b. |
| WA (45° C.)/% | 3.0 | 3.9 |
| WA (30° C.)/% | 2.6 | 3.5 |

The results of polymerised compositions 11 to 17 clearly show that, owing to the addition of the hydrophilic component, good refractive index changes are still achieved, but no opacification occurs in the glistening test if the amount of hydrophilic component is selected in accordance with the invention.

However, formula (2) should read:
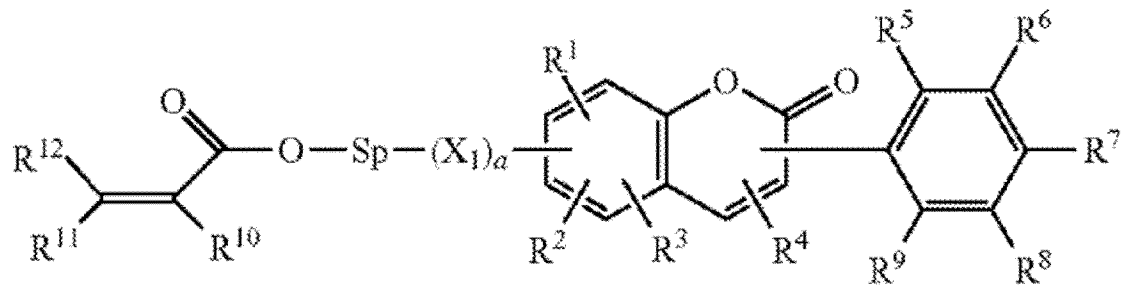
At Column 8, Lines 56-63, formula (3) currently reads:
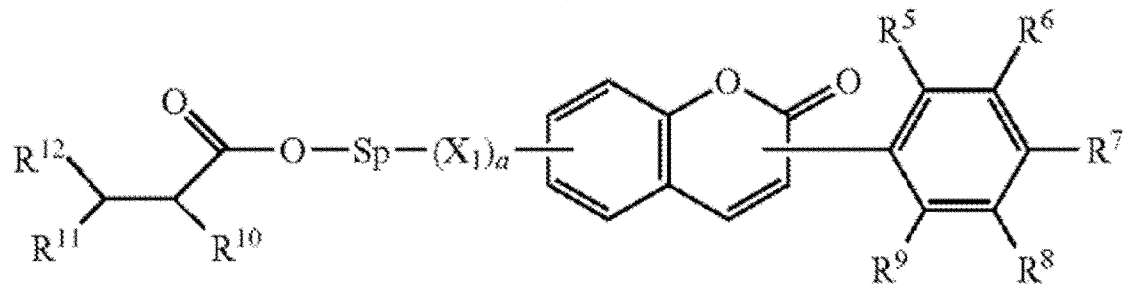
However, formula (3) should read:
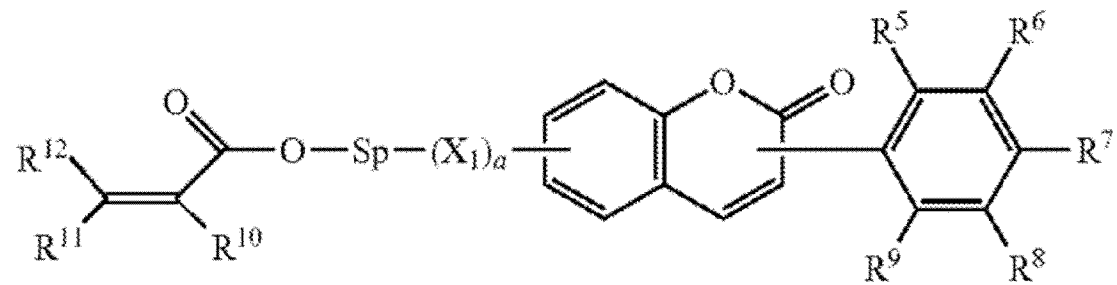

The invention claimed is:

1. A composition comprising at least one compound of the formula (1)

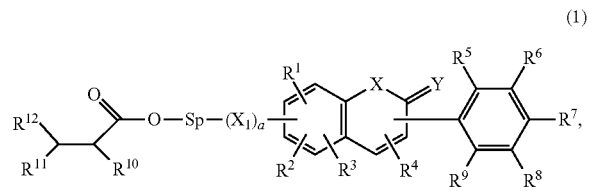

where the following applies to the symbols and indices used:
X is on each occurrence, identically or differently, O, S or $NR^0$;
Y is on each occurrence, identically or differently, O or S;
$X_1$ is O or S;
a is 0 or 1;
Sp is an alkanediyl, alkenediyl or alkynediyl, which may be substituted by one or more groups R;
$R^0$ is a straight-chain or branched alkyl group having 1 to 10 C atoms;
$R^1$, $R^2$, $R^3$ and $R^4$ are in each case, independently of one another on each occurrence, H, F, Cl, Br, I, a straight-chain or branched alkyl group having 1 to 20 C atoms, a partially or fully halogenated straight-chain or branched alkyl group having 1 to 20 C atoms or an aryl or heteroaryl group having 5 to 40 ring atoms;
$R^5$, $R^6$, $R^7$, $R^8$ and $R^9$ are in each case, independently of one another on each occurrence, H, F, Cl, Br, I, a straight-chain or branched alkyl group having 1 to 20 C atoms, a straight-chain or branched alkoxy group having 1 to 20 C atoms, a partially or fully halogenated straight-chain or branched alkyl group having 1 to 20 C atoms, a partially or fully halogenated straight-chain or branched alkoxy group having 1 to 20 C atoms or an aryl or heteroaryl group having 5 to 40 ring atoms, where at least one radical from the group of substituents $R^5$ to $R^9$ denotes a straight-chain or branched alkyl group having 1 to 20 C atoms, which may be partially or fully halogenated;
$R^{10}$, $R^{11}$, $R^{12}$ are in each case, independently of one another on each occurrence, H, F, a linear or branched alkyl group having 1 to 20 C atoms, which may be partially or fully halogenated, or an aryl group having 6 to 14 C atoms;
R is selected on each occurrence, identically or differently, from the group consisting of a straight-chain or branched alkyl group having 1 to 10 C atoms, a partially halogenated or fully halogenated straight-chain or branched alkyl group having 1 to 10 C atoms, a straight-chain or branched alkoxy group having 1 to 10 C atoms or a partially halogenated or fully halogenated straight-chain or branched alkoxy group having 1 to 10 C atoms;
at least one hydrophilic monomer whose uncrosslinked homopolymer is water-soluble or swellable in water;
at least one UV absorber and at least one crosslinker, where the molar ratio of the sum of all compounds of the formula (1) to the sum of all hydrophilic monomers is 1:0.51 to 1:1.24.

2. A composition according to claim 1, characterised in that it comprises at least one further non-hydrophilic monomer which does not conform to the formula (1) and/or a blue absorber.

3. A composition according to claim 2, characterised in that it comprises
1 molar equivalent of a compound of the formula (1) or 1 molar equivalent of the sum of all compounds of the formula (1);
0.51 to 1.24 molar equivalents of the hydrophilic monomers;
0 to 1.0 molar equivalents of the non-hydrophilic monomers which do not conform to the formula (1);
0.04 to 0.5 molar equivalents of the crosslinker(s) and
0.005 to 0.05 molar equivalents of the UV absorber(s).

4. A composition according to claim 1, characterised in that the composition comprises a free-radical initiator.

5. A composition according to claim 2, characterised in that the composition consists of
one molar equivalent of a compound of formula (1) or one molar equivalent of the sum of all compounds of the formula (1);
0.51 to 1.24 molar equivalents of the hydrophilic monomers;
0 to 1.0 molar equivalents of the non-hydrophilic monomers which do not conform to the formula (1);
0.04 to 0.5 molar equivalents of the crosslinker(s);
0.005 to 0.05 molar equivalents of the UV absorber(s);
0 to 0.004 molar equivalents of the blue absorber(s) and
0.0025 to 0.05 molar equivalents of a free-radical initiator.

6. A composition according to claim 1, characterised in that the at least one hydrophilic monomer is selected from 3-hyroxypropyl methacrylate, 3-hydroxypropyl acrylate, 2-hydroxyethyl methacrylate, 2-hydroxyethyl acrylate, 4-hydroxybutyl methacrylate, 4-hydroxybutyl acrylate, glyceryl methacrylate, glyceryl acrylate, acrylamide, N-vinylpyrrolidone, 6-hydroxyhexyl methacrylate, 6-hydroxyhexyl acrylate, 18-hydroxyoctadecyl methacrylate, 18-hydroxyoctadecyl acrylate, 11-hydroxyundecyl methacrylate, 11-hydroxyundecyl acrylate, 12-hydroxydodecyl methacrylate, 12-hydroxydodecyl acrylate, ethylene glycol phenyl ether acrylate, ethylene glycol phenyl ether methacrylate or a combination of these compounds.

7. A composition according to claim 1, characterised in that the crosslinker is selected from para-divinylbenzene, allyl acrylate, ethylene glycol divinyl ether, divinyl sulfone, allyl methacrylate, N,N'-methylene-bis-acrylamide, ethylene glycol diacrylate, N,N'-methylene-bis-methacrylamide, 1,3-propanediol diacrylate, 2,3-propanediol diacrylate, 1,4-butanediol diacrylate, 1,3-butanediol diacrylate, 1,5-pentanediol diacrylate, 1,6-hexanediol diacrylate, 1,7-heptanediol diacrylate, 1,8-octanediol diacrylate, 1,9-nonanediol diacrylate, 1,10-decanediol diacrylate, 1,11-undecanediol diacrylate, 1,12-dodecanediol diacrylate, 1,13-tridecanediol diacrylate, 1,14-tetradecanediol diacrylate, 1,15-pentadecanediol diacrylate, 1,16-hexadecanediol diacrylate, 1,17-heptadecanediol diacrylate, 1,18-octadecanediol diacrylate, 1,19-nonadecanediol diacrylate, 1,20-eicosanediol diacrylate, 1,21-heneicosanediol diacrylate, 1,22-docosanediol diacrylate, 1,23-tricosanediol diacrylate, 1,24-tetracosanediol diacrylate, ethylene glycol dimethacrylate, N,N'-dihydroxyethylenebisacrylamide, thiodiethylene glycol diacrylate, 1,3-propanediol dimethacrylate, 2,3-propanediol dimethacrylate, 1,3-butanediol dimethacrylate, 1,4-butanediol dimethacrylate, 1,5-pentanediol dimethacrylate, 1,6-hexanediol dimethacrylate, 1,7-heptanediol dimethacrylate, 1,8-octanediol dimethacrylate, 1,9-nonanediol dimethacrylate, 1,10-decanediol dimethacrylate, 1,11-undecanediol dimethacrylate, 1,12-dodecanediol dimethacrylate, 1,13-tridecanediol dimethacrylate, 1,14-tetradecanediol dimethacrylate, 1,15-pentadecanediol dimethacrylate, 1,16-hexadecanediol dimethacrylate, 1,17-heptadecanediol dimethacrylate, 1,18-octadecanediol dimeth-acrylate, 1,19-nonadecanediol dimethacrylate, 1,20-eicosanediol dimethacrylate, 1,21-heneicosanediol dimethacrylate, 1,22-docosanediol dimethacrylate, 1,23-tricosanediol dimethacrylate, 1,24-tetracosanediol dimethacrylate, 2-(acryloyloxy)ethyl methacrylate, 2-(acryloyloxy)propyl methacrylate, 3-(acryloyloxy)propyl methacrylate, 4-(acryloyloxy)butyl methacrylate, 5-(acryloyloxy)pentyl methacrylate, 6-(acryloyloxy)hexyl methacrylate, 7-(acryloyloxy)heptyl methacrylate, 8-(acryloyloxy)octyl methacrylate, 9-(acryloyloxy)nonyl methacrylate, 10-(acryloyloxy)decyl methacrylate, 11-(acryloyloxy)undecyl methacrylate, 12-(acryloyloxy)dodecyl methacrylate, 13-(acryloyloxy)tridecyl methacrylate, 14-(acryloyloxy)tetradecyl methacrylate, 15-(acryloyloxy)pentadecyl methacrylate, 16-(acryloyloxy)hexadecyl methacrylate, 17-(acryloyloxy)heptadecyl methacrylate, 18-(acryloyloxy)octadecyl methacrylate, 19-(acryloyloxy)nonadecyl methacrylate, 20-(acryloyloxy)eicosanyl methacrylate, 21-(acryloyloxy) heneicosanyl methacrylate, 22-(acryloyloxy)docosanyl methacrylate, 23-(acryloyloxy)tricosanyl methacrylate, 24-(acryloyloxy)tetracosanyl methacrylate, neopentyl glycol diacrylate, di(ethylene glycol) diacrylate, N,N'-hexamethylene-bisacrylamide, thiodiethylene glycol diacrylate, thiodiethylene glycol dimethacrylate, neopentyl glycol dimethacrylate, diethylene glycol dimethacrylate, diallyl phthalate, triallyl cyanurate, glyceryl 1,3-dimethacrylate, N,N'-hexamethylenebismethacrylamide, tri(ethylene glycol) diacrylate, tri(ethylene glycol) dimethacrylate, tetra(ethylene glycol) diacrylate, tetra(ethylene glycol) dimethacrylate, penta (ethylene glycol) diacrylate, penta(ethylene glycol) dimethacrylate, hexa(ethylene glycol) diacrylate, hexa(ethylene glycol) dimethacrylate, poly(ethylene glycol) dimethacrylate, poly(ethylene glycol) diacrylate.

8. A composition according to claim 1, characterised in that the UV absorber is selected from 3-(3-(tert-butyl)-4-hydroxy-5-(5-methoxy-2H-benzo[d]-1,2,3-triazol-2-yl)-phenoxy)propyl methacrylate, 2-(2-hydroxy-5-vinylphenyl)-2H-benzotriazole, allyl-2-hydroxybenzophenone, 2-allyl-6-(2H-benzotriazol-2-yl)-p-cresol, 4-methacryloxy-2-hydroxybenzophenone, 2-(2'-hydroxy-3'-methallyl-5'-methylphenyl)benzotriazole, 2-hydroxy-4-methacryloyloxybenzophenone, 4-acryloylethoxy-2-hydroxybenzophenone, 2-[3-(2H-benzotriazol-2-yl)-4-hydroxyphenyl]ethyl methacrylate, 2-(2'-hydroxy-5'-methacrylamidophenyl)-5-methoxybenzotriazole, 2-(2'-hydroxy-5'-methacrylamidophenyl)-5-chlorobenzotriazole, 2-(2'-hydroxy-5'-methacryloxypropylphenyl)benzotriazole, 2-(2'-hydroxy-5'-methacryloylpropyl-3'-tert-butyl-phenyl)-5-methoxy-2H-benzotriazol, 2-(3-(tert-butyl)-4-hydroxy-5-(5-methoxy-2H-benzo[d]-1,2,3-triazol-2-yl)phenoxy)ethyl methacrylate, 2-[3'-tert-butyl-2'-hydroxy-5'-(3"-methacryloyloxypropyl)phenyl]-5-chlorobenzotriazole, 2-{2'-hydroxy-3'-tert-butyl-5'-[3'-methacryloyloxypropoxy]phenyl}-5-methoxy-2H-benzotriazole, 2-[3'tert-butyl-5'-(3"-dimethylvinylsilylpropoxy)-2'-hydroxyphenyl]-5-methoxybenzotriazole, 2-(tert-butyl)-6-(5-chloro-2H-benzo[d]-1,2,3-triazol-2-yl)-4-vinylphenol, 2-(2H-1,2,3-benzotriazol-2-yl)-4-methyl-6-(2-methylprop-2-enyl) phenol, 2-(3-acetyl-2-aminophenoxy)ethyl methacrylate, 2-(4-benzoyl-3-hydroxyphenoxy)ethyl acrylate or a combination of these compounds.

9. A crosslinked copolymer containing a polymerised composition according to claim 1.

10. A process for the preparation of a crosslinked copolymer containing a polymerized composition according to claim 1, characterised in that a composition according to claim 1 is provided and subsequently subjected to free-radical polymerisation, where the polymerisation temperature to be selected on use of a thermal free-radical initiator does not lie within a miscibility gap of the materials.

11. A method comprising using a composition according to claim 1 for the production of a blank for an ophthalmic lens or an ophthalmological implant.

12. A method according to claim 11 for the production of an intraocular lens.

13. An article comprising a copolymer according to claim 9.

14. The article according to claim 13, which is a blank for an ophthalmic lens, a blank for an ophthalmological implant, an ophthalmological implant, an ophthalmic lens, an intraocular lens or a phakic lens.

15. A process for the production of an article comprising a crosslinked copolymer containing a polymerized composition according to claim 1, characterised in that a composition according to claim 1 is provided, a polymerisation is carried out, and the article is shaped at the same time or subsequently.

\* \* \* \* \*

UNITED STATES PATENT AND TRADEMARK OFFICE
CERTIFICATE OF CORRECTION

PATENT NO. : 11,359,031 B2
APPLICATION NO. : 16/957011
DATED : June 14, 2022
INVENTOR(S) : Lars Dobelmann-Mara et al.

It is certified that error appears in the above-identified patent and that said Letters Patent is hereby corrected as shown below:

In the Specification

At Column 4, Lines 25-30 and in Claim 1, Column 45, Lines 15-20, formula (1) currently reads:

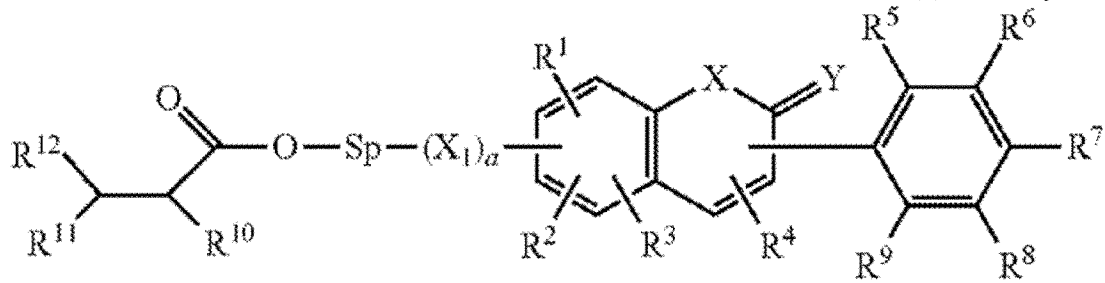

However, formula (1) should read:

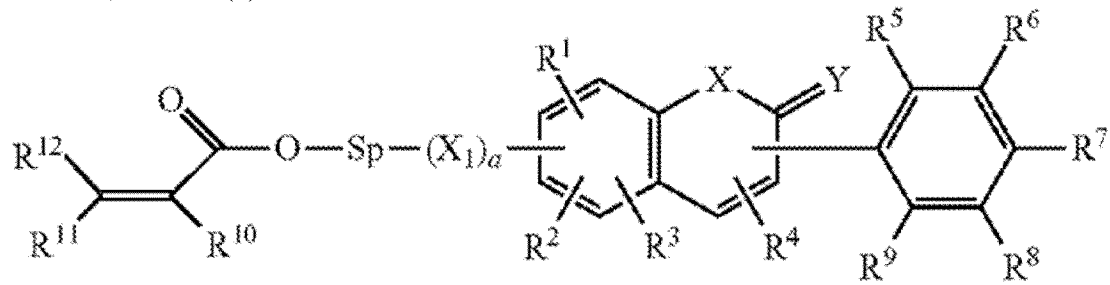

At Column 8, Lines 26-34, formula (2) currently reads:

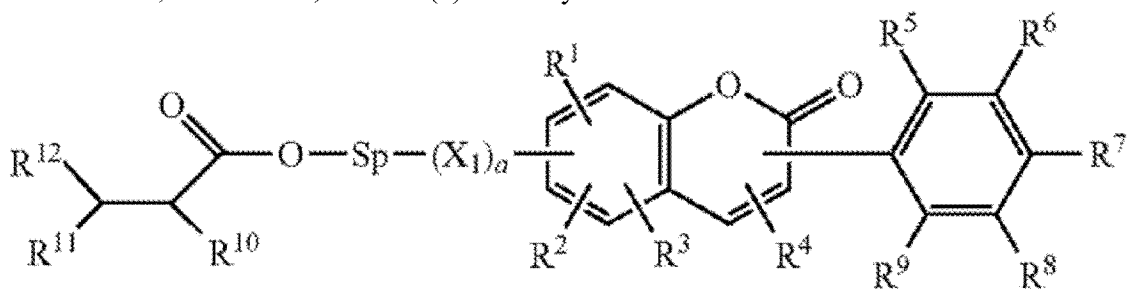

Signed and Sealed this
Sixth Day of September, 2022

Katherine Kelly Vidal
*Director of the United States Patent and Trademark Office*